(12) United States Patent
Minoguchi et al.

(10) Patent No.: US 11,316,588 B2
(45) Date of Patent: Apr. 26, 2022

(54) WAVELENGTH DISPERSION COMPENSATION APPARATUS, WAVELENGTH DISPERSION COMPENSATION METHOD, AND OPTICAL RECEIVING APPARATUS

(71) Applicant: NIPPON TELEGRAPH AND TELEPHONE CORPORATION, Tokyo (JP)

(72) Inventors: Kyo Minoguchi, Musashino (JP); Etsushi Yamazaki, Musashino (JP); Seiji Okamoto, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/278,627

(22) PCT Filed: Aug. 27, 2019

(86) PCT No.: PCT/JP2019/033474
§ 371 (c)(1),
(2) Date: Mar. 22, 2021

(87) PCT Pub. No.: WO2020/066423
PCT Pub. Date: Apr. 2, 2020

(65) Prior Publication Data
US 2022/0038180 A1   Feb. 3, 2022

(30) Foreign Application Priority Data
Sep. 26, 2018  (JP) .............................. JP2018-180887

(51) Int. Cl.
*H04B 10/2513* (2013.01)
(52) U.S. Cl.
CPC ............................... *H04B 10/2513* (2013.01)
(58) Field of Classification Search
None
See application file for complete search history.

(56) References Cited

U.S. PATENT DOCUMENTS 8,768,173 B2 * 7/2014 Tanimura ............... H04B 10/61
398/158
9,686,020 B2 * 6/2017 Mochizuki ........... H04B 10/616
(Continued)

FOREIGN PATENT DOCUMENTS

JP         2018093280 A      6/2018

*Primary Examiner* — Jai M Lee

(57) ABSTRACT

Provided is a chromatic dispersion compensation method including: dividing a reception signal obtained by receiving an optical signal using a coherent detection scheme into a plurality of frequency bands; adjusting a timing on a time axis of the reception signal for each of the divided frequency bands; performing combination processing for combining the reception signals included in the plurality of frequency bands; performing chromatic dispersion compensation on the reception signal at any timing before or after the combination processing; selecting, before the combination processing, sections in which overlapping parts determined based on lengths of overlap parts are generated; outputting the reception signal for each of the selected sections as a division processing block; and removing the overlap parts from both ends of a processing block generated by combination of the division processing blocks in the combination processing so as to be continuous on a frequency axis.

5 Claims, 21 Drawing Sheets

(56) References Cited

U.S. PATENT DOCUMENTS 10,193,593 B2 * 1/2019 Yasuda ................ H04B 3/06
2020/0067598 A1 * 2/2020 Yoshida ............ H04B 10/6161

* cited by examiner

Fig. 5

| BLOCK NAME | NUMBER OF PROCESSING SAMPLES | PROCESSING CONTENTS |
|---|---|---|
| 30: SECTION SELECTION UNIT | 512 | PREDETERMINE 512 SAMPLES AT BOTH ENDS OF PROCESSING BLOCK (256 SAMPLES AT BOTH ENDS OF DIVISION PROCESSING BLOCK) AS OVERLAP PART, AND SELECTS SECTION IN WHICH OVERLAPPING PART OF 512 SAMPLES IS GENERATED BETWEEN ADJACENT PROCESSING BLOCKS. |
| 31: FOURIER TRANSFORM UNIT | 1024 | PERFORM FFT PROCESSING OF SIZE OF 1024 SAMPLES, AND DIVIDE INTO TWO FREQUENCY BANDS. |
| 40-1, 40-2: CHROMATIC DISPERSION COMPENSATOR | 512 | PERFORM CHROMATIC DISPERSION COMPENSATION ON RECEPTION SIGNAL (SIZE OF 512 SAMPLES) OF EACH FREQUENCY BAND. |
| 41-1, 41-2: INVERSE FOURIER TRANSFORM UNIT | 512 | PERFORM IFFT PROCESSING OF SIZE OF 512 SAMPLES ON RECEPTION SIGNAL INCLUDED IN EACH FREQUENCY BAND. |
| 42-1, 42-2: OVERLAP CUT UNIT | 256 | REMOVE OVERLAP PART (256 SAMPLES AT BOTH ENDS) FROM OVERLAPPING PART AT BOTH ENDS OF BLOCK TO BE PROCESSED. |
| 43-1, 43-2: DELAY UNIT | 256 | GIVE DELAY TO RECEPTION SIGNAL OF EACH FREQUENCY BAND TO ADJUST TIMING. |
| PRE-COMBINATION 33-1, 33-2: SECTION SELECTION UNIT | 128 | PREDETERMINE 128 SAMPLES AT BOTH ENDS OF PROCESSING BLOCK (64 SAMPLES AT BOTH ENDS OF DIVISION PROCESSING BLOCK) AS OVERLAP PART, AND SELECTS SECTION IN WHICH OVERLAPPING PART OF 128 SAMPLES IS GENERATED BETWEEN ADJACENT PROCESSING BLOCKS. |
| 50-1, 50-2: FOURIER TRANSFORM UNIT | 256 | PERFORM FFT PROCESSING OF SIZE OF 256 SAMPLES. |
| 51: COMBINATION UNIT | 512 | COMBINE RECEPTION SIGNAL OF DIVIDED FREQUENCY BAND. NUMBER OF SAMPLES AFTER COMBINATION IS 512. |
| 52: INVERSE FOURIER TRANSFORM UNIT | 512 | PERFORM IFFT PROCESSING OF SIZE OF 512 SAMPLES ON RECEPTION SIGNAL AFTER COMBINATION. |
| 35: POST-COMBINATION OVERLAP CUT UNIT | 256 | REMOVE OVERLAP PART (256 SAMPLES AT BOTH ENDS) FROM OVERLAPPING PART AT BOTH ENDS OF BLOCK TO BE PROCESSED. |

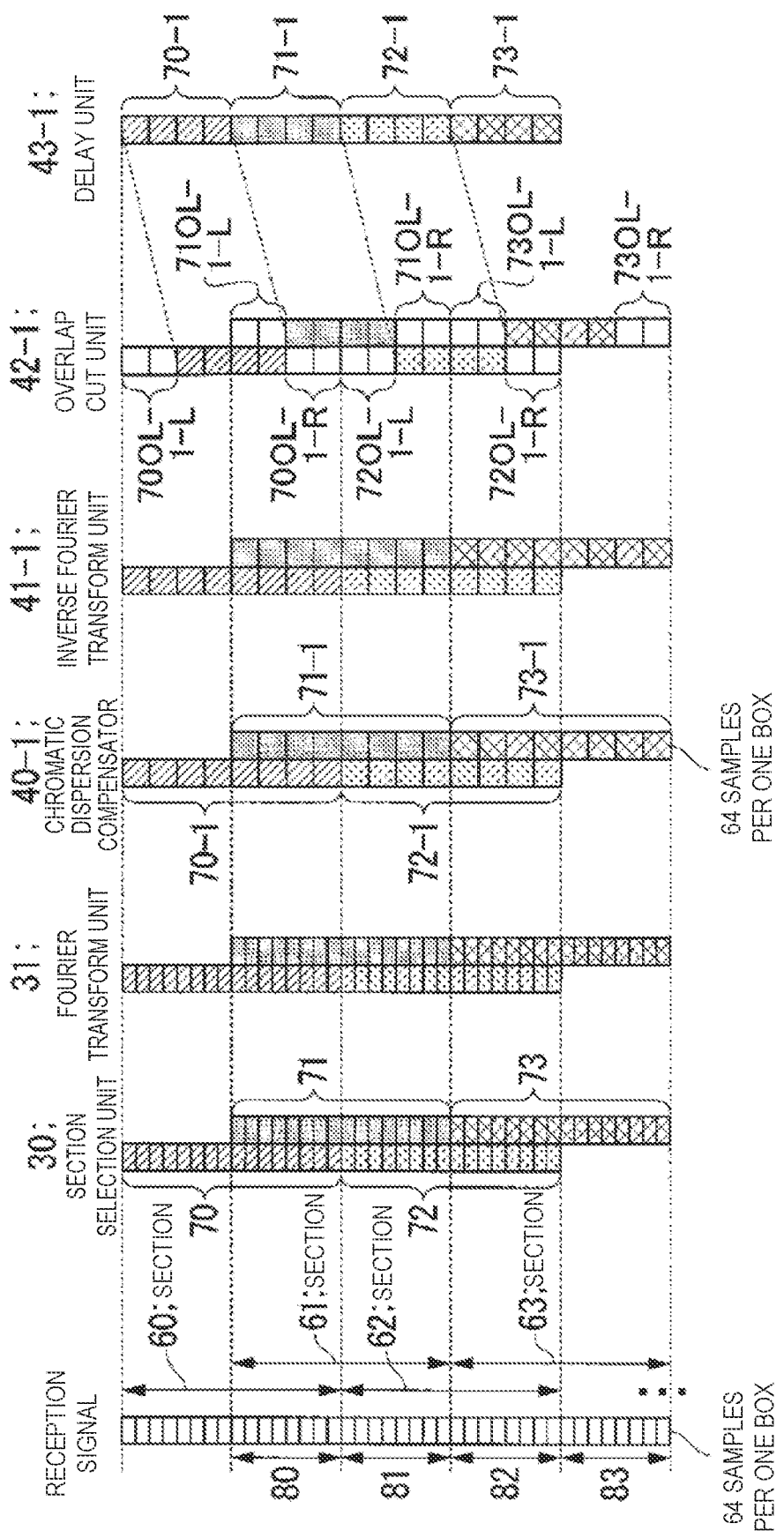

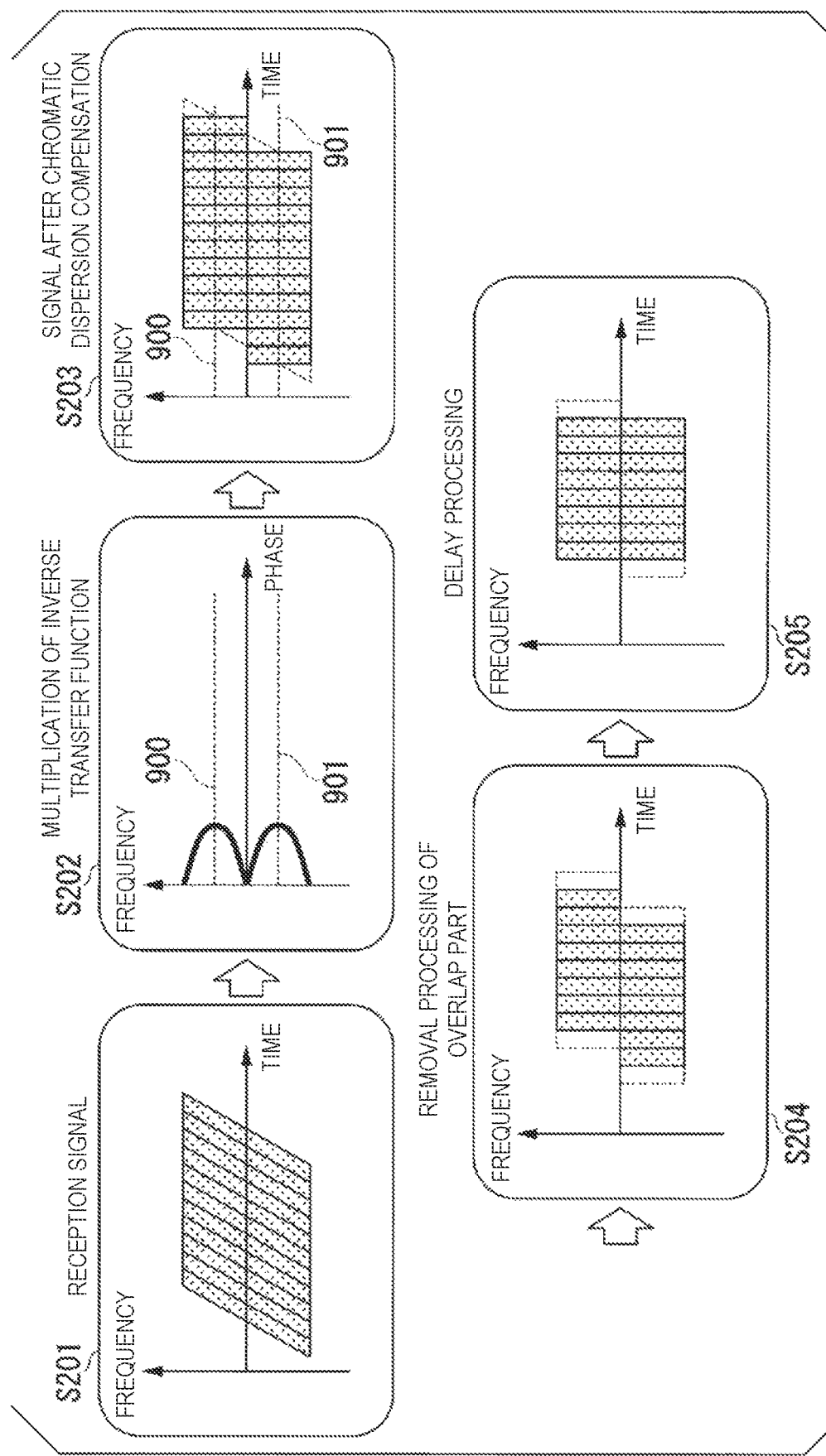

… (1) …

WAVELENGTH DISPERSION COMPENSATION APPARATUS, WAVELENGTH DISPERSION COMPENSATION METHOD, AND OPTICAL RECEIVING APPARATUS

CROSS-REFERENCE TO RELATED APPLICATIONS

This application is a 371 U.S. National Phase of International Application No. PCT/JP2019/033474 filed on Aug. 27, 2019, which claims priority to Japanese Application No. 2018-180887 filed on Sep. 26, 2018. The entire disclosures of the above applications are incorporated herein by reference.

TECHNICAL FIELD

The present invention relates to a chromatic dispersion compensation device, a chromatic dispersion compensation method, and an optical reception device.

BACKGROUND ART

In an optical communication, it is known that waveforms of optical signals are distorted due to the chromatic dispersion effect of an optical fiber in a process of propagation of the optical signals in the optical fiber. Chromatic dispersion is a phenomenon that occurs when a propagation velocity in the optical fiber varies depending on wavelengths, and the longer the optical fiber, the greater the effect of chromatic dispersion.

Conventionally, compensation of waveform distortion caused by the chromatic dispersion has been performed using a dispersion compensation fiber having chromatic dispersion characteristics opposite to that of the optical fiber of an optical transmission line. On the other hand, in coherent optical communication in recent years, chromatic dispersion compensation has been performed by digital signal processing by utilizing phase information obtained on a receiving side.

The coherent optical communication is performed by an optical transmission system S as shown in FIG. 15, for example. The optical transmission system S includes an optical transmission device 300, an optical reception device 400, and an optical transmission line 1000. The optical transmission line 1000 is formed of an optical fiber that connects the optical transmission device 300 and the optical reception device 400. In the optical transmission device 300, an electric signal generation unit 310 takes in transmission information given from an external information source, and encode the taken transmission information to generate an electric signal. An optical signal generation unit 311 converts the electric signal generated by the electric signal generation unit 310 into an optical signal and transmits the optical signal.

The optical transmission line 1000 transmits the optical signal transmitted from the optical transmission device 300 to the optical reception device 400. In the optical reception device 400, a coherent optical reception unit 401 includes a 90° optical hybrid circuit, a local oscillation light source, a photodetector, an optical fiber that connects these components, and receives an optical signal using a coherent detection scheme.

In the digital signal processing unit 402, an analog-digital conversion unit 411 quantizes an electric analog signal output from the coherent optical reception unit 401 and converts it into a digital signal. A chromatic dispersion compensation processing unit 412 takes in the digital signal as a reception signal, and performs chromatic dispersion compensation on the taken reception signal. An adaptive equalization processing unit 413 performs adaptive equalization processing on the reception signal subjected to the chromatic dispersion compensation. A phase compensation unit 414 performs compensation on a phase offset generated between light sources of a transmitter and a receiver. A frequency offset compensation unit 415 performs compensation of a frequency offset generated between the light sources of the transmitter and the receiver. An error correction unit 416 performs error correction on the reception signal output from the frequency offset compensation unit 415 based on an error correction code scheme, and outputs the error-corrected reception signal to the outside.

FIG. 16 is a diagram showing an example of a procedure of chromatic dispersion compensation processing in the optical transmission system S. The optical transmission device 300 transmits, as a transmission signal, an optical signal having a certain occupied band in both directions of a plus direction and a minus direction of a frequency with respect to a center frequency. When a transmission signal is shown on a coordinate axis having a horizontal axis as a time and a vertical axis as a frequency, the transmission signal is represented by a rectangular shape (step S101).

As described above, when the transmission signal propagates through the optical fiber of the optical transmission line 1000, the waveform distortion occurs because the propagation velocity of each frequency of the transmission signal is different due to the chromatic dispersion effect of the optical fiber. The waveform distortion can be represented, for example, as a phase delay that occurs in the waveform, and the phase delay can be represented as an arithmetic operation of multiplying the transmission signal by a transfer function that represents chromatic dispersion characteristics approximated by a quadratic function (step S102).

The coherent optical reception unit 401 of the optical reception device 400 receives the optical signal transmitted from the optical transmission line 1000 by coherent detection. The analog-digital conversion unit 411 converts the electric analog signal output from the coherent optical reception unit 401 into a digital signal.

The digital signal obtained by the conversion is represented in a shape of a parallelogram because the phase delay causes a substantial linear delay as the frequency increases (step S103).

As a chromatic dispersion compensation method using the digital signal processing performed by the chromatic dispersion compensation processing unit 412, there is a method of equalizing a frequency domain. Such a method is performed by converting a time-domain reception signal into a frequency-domain reception signal by Fourier transform and returning to the time-domain reception signal by inverse Fourier transform after multiplying by a transfer function (hereinafter, also referred to as inverse transfer function) having a transfer function representing the characteristics of the chromatic dispersion received in the optical transmission line 1000.

In addition, since the chromatic dispersion compensation in the frequency domain is block processing, inter-block interference (hereinafter, also referred to as IBI) occurs in which distortion remains in signals near both ends of the block. In order to prevent such an IBI, for example, a frequency domain equalizing method combined with overlap processing is used.

As shown in FIG. 17, the overlap processing is performed by a procedure including a process of selecting a section including an overlapping part having a length based on a length of the overlap part, a process of equalizing the frequency domain, and a process of removing the overlap part. Here, as the process of equalizing the frequency domain, chromatic dispersion compensation will be described as an example.

The chromatic dispersion compensation processing unit 412 takes in the digital signal output from the analog-digital conversion unit 411 as a reception signal, and selects, for the taken reception signal, sections 500, 501, 502, 503, 504, 505, . . . in time-series order. Here, it is assumed that a length of each of the sections 500, 501, 502, . . . is predetermined to be 10 boxes. Each of the boxes includes a fixed number of reception signal samples.

The chromatic dispersion compensation processing unit 412 selects each of the sections 500, 501, 502, . . . such that overlapping parts 700, 701, 702, . . . having lengths determined based on the lengths of the overlap parts occur in adjacent sections overlap part.

The chromatic dispersion compensation processing unit 412 sets partial reception signals selected from the entire reception signals according to the selected sections 500, 501, 502, . . . as processing blocks 600, 601, 602, 603, 604, 605, . . . , respectively. The chromatic dispersion compensation processing unit 412 performs Fourier transform on each of the processing blocks 600, 601, 602, . . . , and converts time-domain reception signals into frequency-domain reception signals. The chromatic dispersion compensation processing unit 412 multiplies each of the processing blocks 600, 601, 602, . . . including the frequency-domain reception signals by an inverse transfer function to perform a process of compensating distortion due to chromatic dispersion (step S104).

The chromatic dispersion compensation processing unit 412 performs an inverse Fourier transform on the frequency-domain signals multiplied by the inverse transfer function to return it to the time-domain signal. Thus, a rectangular signal similar to the transmission signal can be obtained as the reception signal subjected to the chromatic dispersion compensation (step S105).

As described above, since the chromatic dispersion compensation in the frequency domain is block processing, IBI is generated near both ends of the processing blocks 600, 601, 602, . . . subjected to the inverse Fourier transform. In order to prevent such an IBI, the chromatic dispersion compensation processing unit 412 predetermines, as overlapping parts, parts having predetermined lengths at both ends of each of the processing blocks 600, 601, 602, . . . .

For example, as shown in FIG. 18, 10 boxes of each of the processing blocks 600, 601, and 602 are indicated as boxes 600-1 to 600-10, 601-1 to 601-10, and 602-1 to 602-10, respectively.

In the chromatic dispersion compensation processing unit 412, it is assumed that one box at both ends of each of the processing blocks 600, 601, 602, . . . is predetermined as an overlap part. Then, in the case of the processing block 600, the boxes 600-1 and 600-10 become overlap parts 600OL-L and 600OL-R, respectively. In the case of the processing block 601, the boxes 601-1 and 601-10 become overlap parts 601OL-L and 601OL-R, respectively. In the case of the processing block 602, the boxes 602-1 and 602-10 become overlap parts 602OL-L and 602OL-R, respectively.

At this time, regarding the overlapping part 700, the box 600-10 of the overlap part 600OL-R of the processing block 600 overlaps with the box 601-2 of the processing block 601. On the other hand, the box 601-1 of the overlap part 601OL-L of the processing block 601 overlaps with the box 600-9 of the processing block 600. Accordingly, even when the overlap part 600OL-R of the processing block 600 is removed, samples of the reception signal of the overlap part 600OL-R remain in the box 601-2 of the processing block 601. In addition, even when the overlap part 601OL-L of the processing block 601 is removed, samples of the reception signal of the overlap part 601OL-L remain in the box 600-9 of the processing block 600.

In other words, even when the overlap parts 600OL-L, 600OL-R, 601OL-L, 601OL-R, . . . are removed in any of the processing blocks 600, 601, . . . , samples corresponding to the removed overlap parts 600OL-L, 600OL-R, 601OL-L, 601OL-R, . . . remain in the other processing blocks 600, 601, . . . . Therefore, in the overlapping parts 700, 701, . . . , the length of each of the overlapping parts 700, 701, . . . is determined as, for example, two boxes as shown in FIG. 18, so that the overlap parts 600OL-L, 600OL-R, 601OL-L, 601OL-R, . between the different processing blocks 600, 601, . . . do not become the same reception signal sample.

In the first and last processing blocks, for example, the first processing block 600 shown in FIG. 17, the left end overlap part 600OL-L does not overlap with other processing blocks 601, 602, . . . . For this reason, regarding the overlap part 600OL-L, samples do not remain as an exception due to the removal, but the IBI is prevented by the removal.

For example, as shown in FIG. 19, it is assumed that the overlap part of the processing block 601 is set to have a length twice that in FIG. 18. In this case, the overlap part 601OL-L of the processing block 601 becomes the boxes 601-1 and 601-2, and the overlap part 601OL-R becomes the boxes 601-9 and 601-10. Accordingly, the lengths of the overlapping parts 700 and 701 also need to be doubled.

The length of each of the overlapping parts 700, 701, . . . is not limited to twice the length of each of the overlap parts 600OL-L, 600OL-R, 601OL-L, 601OL-R, . . . , and may be twice or more. For example, in the overlapping parts 700, 701, . . . shown in FIG. 19, the box of the overlap part may be one box at both ends of each of the processing blocks 600, 601, . . . , that is, 600-1, 600-10, 601-1, 601-10, . . . may be the overlap parts.

Returning to FIG. 16, the chromatic dispersion compensation processing unit 412 removes the overlap parts 6000R-L, 6000R-R, 6010R-L, 6010R-R, . . . of the processing blocks 600, 601, 602, . . . for the reception signals (step S106).

The chromatic dispersion compensation processing unit 412 combines the receptions signals, from which the overlap parts 600OL-L, 600OL-R, 601OL-L, 601OL-R, . . . are removed, to be a continuous signal sequence. Thus, the IBI is prevented, and the reception signals subjected to chromatic dispersion compensation can be obtained.

By the way, the amount of chromatic dispersion capable of being compensated by the chromatic dispersion compensation processing unit 412 depends on the number of samples that can be removed in the overlap processing. For example, the larger the number of samples that can be removed, that is, the longer the overlap parts 6000R-L, 6000R-R, 6010R-L, 6010R-R, . . . , the larger the amount of chromatic dispersion that can be compensated.

Since the amount of phase delay caused by the chromatic dispersion also increases as the length of the optical fiber of the optical transmission line 1000 becomes longer, it is necessary to increase the amount of chromatic dispersion that can be compensated accordingly. For this reason, it is necessary to increase the lengths of the overlap parts 6000R-L, 6000R-R, 6010R-L, 6010R-R, . . . . In order to increase the lengths of the overlap part 6000R-L, 6000R-R, 6010R-L, 6010R-R, . . . , it is necessary to increase the lengths of the sections 500, 501, 502, . . . and increase the sizes of the processing blocks 600, 601, 602, . . . .

However, the increase in size of the processing blocks 600, 601, 602, . . . may cause a problem of increasing the circuit scale and power consumption of the digital signal processing unit 402. To solve such a problem, there has been proposed a method of expanding the amount of chromatic dispersion capable of being compensated without changing the size of the processing block (for example, see Patent Literature 1).

A chromatic dispersion compensation processing unit 412a shown in FIG. 20 will be described below as an example of a configuration for expanding the amount of chromatic dispersion capable of being compensated without changing the size of the processing block. The chromatic dispersion compensation processing unit 412a is a function unit applied in place of the chromatic dispersion compensation processing unit 412 of the digital signal processing unit 402 in the optical reception device 400 shown in FIG. 15.

A procedure of processing to be performed by the chromatic dispersion compensation processing unit 412a shown in FIG. 20 will be described with reference to FIG. 21. In the chromatic dispersion compensation processing unit 412a, a section selection unit 800 takes in a digital signal output from an analog-digital conversion unit 411 as a reception signal. Since the reception signal is affected by the chromatic dispersion, the reception signal has a shape of a parallelogram in which the delay occurs substantially linearly as the frequency increases (step S201).

The section selection unit 800 performs section selection processing in the overlap processing described with reference to FIG. 17. In other words, the section selection unit 800 selects, for the taken reception signal, sections in which the overlapping parts 700, 701, . . . are generated between sections adjacent to each other in time-series order, and sequentially outputs the processing blocks 600, 601, . . . for each of the sections to a Fourier transform unit 801.

The Fourier transform unit 801 converts time-domain reception signals included in the processing blocks 600, 601, . . . determined by each of the sections selected by the section selection unit 800 into frequency-domain reception signals. In addition, the Fourier transform unit 801 divides each of the processing blocks 600, 601, . . . including the frequency-domain reception signal into two frequency bands of a positive frequency band and a negative frequency band with a center frequency as a reference, for example, and outputs it as a division processing block.

Each of chromatic dispersion compensators (hereinafter, also referred to as CDC) 812-1 and 812-2 takes in a division processing block of a corresponding frequency band, and multiplies an inverse transfer function with a center of the frequency band as a phase rotation axis to perform chromatic dispersion compensation (step S202). A phase rotation axis 900 shown in step S202 of FIG. 21 is, for example, a phase rotation axis of the inverse transfer function applied to one chromatic dispersion compensator 812-1, and a phase rotation axis 901 is a phase rotation axis of the inverse transfer function applied to the other chromatic dispersion compensator 812-2.

Inverse Fourier transform units 813-1 and 813-2 transform the reception signals included in the division processing blocks subjected to the chromatic dispersion compensation by the chromatic dispersion compensators 812-1 and 812-2 into time-domain reception signals (step S203). Overlap cut units 814-1 and 814-2 performs a process of removing the overlap parts in the overlap processing. In other words, each of the overlap cut units 814-1 and 814-2 removes the overlap part having a predetermined length from both ends of the division processing block output from each of the inverse Fourier transform units 813-1 and 813-2 (step S204).

Delay units 815-1 and 815-2 give a delay to the division processing block, from which the overlap part is removed, for each of the frequency bands, eliminate the shift caused by the chromatic dispersion effect, and adjust a timing on a time axis (step S205).

Fourier transform units 820-1 and 820-2 of the combination processing unit 803 transform reception signals included in the division processing block subjected to the timing adjustment into frequency-domain reception signals. The combination unit 821 combines the division processing blocks of the two frequency bands so as to be continuous on a frequency axis and generates the processing blocks 600, 601, . . . . An inverse Fourier transform unit 822 transforms reception signals included in the processing blocks 600, 601, . . . combined by the combination unit 821 into time-domain reception signals, and outputs the reception signals to an adaptive equalization processing unit 413.

The chromatic dispersion compensation processing unit 412a divides the frequency-domain band into two bands, performs chromatic dispersion compensation on the reception signal in each of the divided frequency bands, and then adjusts the amount of delay between the frequency bands in the time domain. Thus, the maximum amount of phase delay caused by the chromatic dispersion for each frequency band is reduced to half the amount in the case of not dividing into two frequency bands. The fact that the amount of phase delay can be reduced to ½ means that the length of the overlap part can also be halved.

Therefore, if the length of the overlap part is set to the same length as in the case of not dividing into two frequency bands, it is possible to make the amount of chromatic dispersion capable of being compensated double without changing the sizes of the processing blocks 600, 601, 602, . . . . In terms of generalization, when the Fourier transform unit 801 divides the block into N frequency bands, the amount of phase delay and the length of the overlap part can be reduced to 1/N as compared with the case where the block is not divided, and the amount of chromatic dispersion capable of being compensated can be increased to N times.

CITATION LIST

Patent Literature

Patent Literature 1: Japanese Patent Laid-Open No. 2018-093280

SUMMARY OF THE INVENTION

Technical Problem

However, in the chromatic dispersion compensation processing unit 412a shown in FIG. 20, there is a problem that the signal quality is deteriorated due to the distortion of the waveform at both ends of the processing blocks 600, 601, . . . of the output signal of the inverse Fourier transform unit 822 by the combination processing of the processing blocks for each frequency band in the combination processing unit 803.

In view of the above circumstances, an object of the present invention is to provide a technique capable of reducing deterioration of signal quality caused by division of the frequency band in the chromatic dispersion compensation process involving the process of dividing the frequency band.

Means for Solving the Problem

An aspect of the present invention is to provide a chromatic dispersion compensation device that divides a reception signal obtained by receiving an optical signal using a coherent detection scheme into a plurality of frequency bands, adjusts a timing on a time axis of the reception signal for each of the divided frequency bands, performs combination processing for combining the reception signals included in the plurality of frequency bands, and performs chromatic dispersion compensation on the reception signal at any timing before or after the combination processing, the device including: a plurality of pre-combination section selection unit provided for each of the frequency bands and configured to select, before the combination processing, sections in which overlapping parts determined based on lengths of overlap parts predetermined between sections adjacent to each other in time-series order with respect to the reception signal for each of the frequency bands are generated, and to output the reception signal for each of the selected sections as a division processing block; and a post-combination overlap cut unit configured to remove the overlap parts from both ends of a processing block generated by combination of the division processing blocks in the combination processing so as to be continuous on a frequency axis.

In the chromatic dispersion compensation device according to the aspect of the present invention, the chromatic dispersion compensation device further includes: a section selection unit configured to select sections in which a first overlapping part determined based a length of a first overlap part determined between sections adjacent to each other in time-series order with respect to the reception signal are generated and to output the reception signals included in the selected sections as processing blocks; a Fourier transform unit configured to transform the output reception signal for each of the processing blocks into a frequency domain, to divide the processing block including the transformed reception signal into a plurality of frequency bands, and to output the processing block as the division processing block; a chromatic dispersion compensation unit configured to perform chromatic dispersion compensation on the division processing block of the frequency band and to remove the first overlap part from both ends of the division processing block; and a combination processing unit configured to perform the combination processing, wherein the pre-combination section selection unit uses the overlapping part as a second overlapping part, arranges the division processing blocks in time-series order, selects sections in which the second overlapping part is generated between sections adjacent to each other in time-series order, and outputs the reception signals included in the selected sections as the division processing blocks, the combination processing unit combines the division processing blocks to generate the processing block, and the post-combination overlap cut unit uses the overlap part as a second overlap part, and removes the second overlap part from both ends of the processing block.

In the chromatic dispersion compensation device according to the aspect of the present invention, the chromatic dispersion compensation unit does not remove the first overlap part from both ends of the division processing block, the pre-combination section selection unit arranges the division processing blocks in time-series order and outputs the division processing blocks directly, and the post-combination overlap cut unit removes the first overlap part from both ends of the processing block.

An aspect of the present invention is to provide a chromatic dispersion compensation method of dividing a reception signal obtained by receiving an optical signal using a coherent detection scheme into a plurality of frequency bands, adjusting a timing on a time axis of the reception signal for each of the divided frequency bands, performing combination processing for combining the reception signals included in the plurality of frequency bands, and performing chromatic dispersion compensation on the reception signal at any timing before or after the combination processing, the method including: selecting, before the combination processing, sections in which overlapping parts determined based on lengths of overlap parts predetermined between sections adjacent to each other in time-series order with respect to the reception signal for each of the frequency bands are generated; outputting the reception signal for each of the selected sections as a division processing block; and removing the overlap parts from both ends of a processing block generated by combination of the division processing blocks in the combination processing so as to be continuous on a frequency axis.

An aspect of the present invention is to provide an optical reception device including: a coherent optical reception unit configured to receive an optical signal using a coherent detection scheme; and a digital signal processing unit, wherein the digital signal processing unit includes an analog-digital conversion unit configured to convert an electric analog signal output from the coherent optical reception unit into a digital signal and to output the digital signal, and a chromatic dispersion compensation processing unit serving as a chromatic dispersion processing unit that is the chromatic dispersion compensation device according to any one of claims 1 to 3 and configured to take in the digital signal output from the analog-digital conversion unit as the reception signal.

Effects of the Invention

According to the present invention, it is possible to reduce the deterioration of the signal quality caused by division of the frequency band in the chromatic dispersion compensation process involving the process of dividing the frequency band.

BRIEF DESCRIPTION OF DRAWINGS

FIG. 5 is a diagram showing processing contents and the number of processing samples of respective function units in the process of the chromatic dispersion compensation processing unit according to the first embodiment.

FIG. 6 is one diagram showing changes in a reception signal due to processing of the respective function units of the chromatic dispersion compensation processing unit according to the first embodiment.

FIG. 21 is a diagram showing a procedure of a process to be performed by the chromatic dispersion compensation processing unit.

DESCRIPTION OF EMBODIMENTS

First Embodiment

Figure 1:
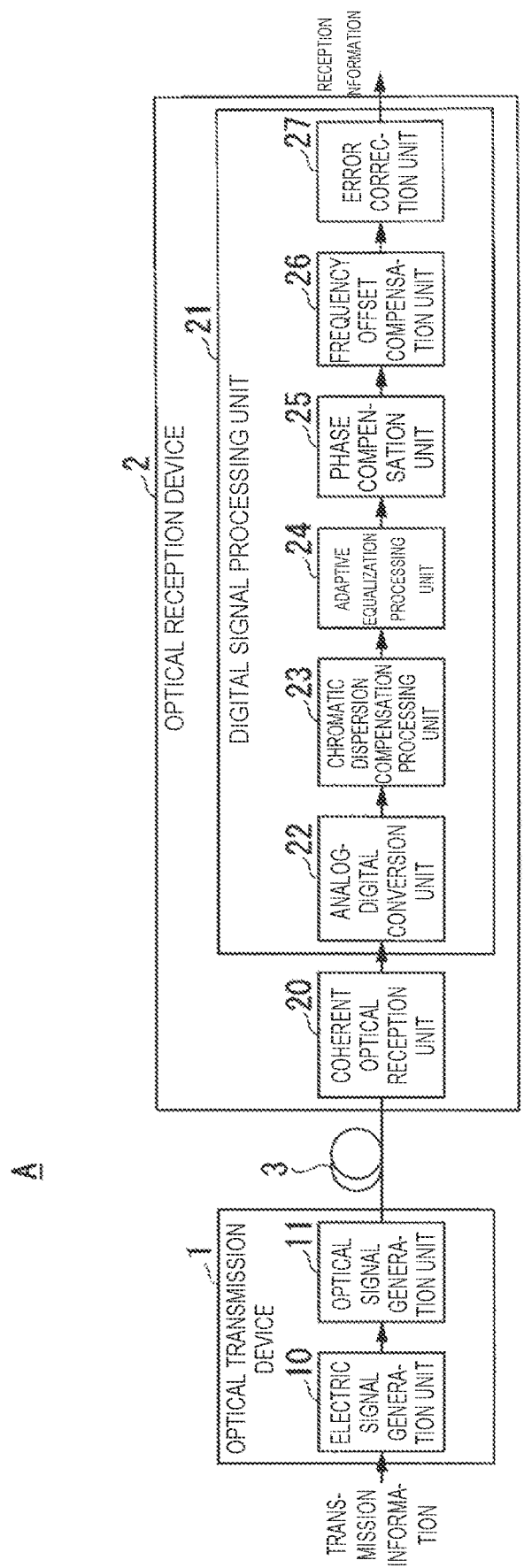
FIG. 1 is a block diagram showing a configuration of an optical transmission system according to a first embodiment.

Embodiments of the present invention will be described below with reference to the drawings. FIG. 1 is a block diagram showing a configuration of an optical transmission system A of a first embodiment. The optical transmission system A includes an optical transmission device 1, an optical reception device 2, and an optical transmission line 3.

The optical transmission device 1 includes an electric signal generation unit 10 and an optical signal generation unit 11.

The electric signal generation unit 10 takes in transmission information given from an external information source, and encodes the taken transmission information to generate an electric signal.

The optical signal generation unit 11 converts the electric signal generated by the electric signal generation unit 10 into an optical signal and transmits the optical signal.

The optical transmission line 3 is used to transmit the optical signal transmitted from the optical transmission device 1 to the optical reception device 2. The optical transmission line 3 is configured by an optical fiber that connects the optical transmission device 1 and the optical reception device 2.

The optical reception device 2 includes a coherent optical reception unit 20 and a digital signal processing unit 21.

The coherent optical reception unit 20 includes a 90° optical hybrid circuit, a local oscillation light source, a photodetector, and an optical fiber that connects these components, and receives an optical signal using a coherent detection scheme. The coherent optical reception unit 20 may include other optical devices such as an optical attenuator.

The digital signal processing unit 21 includes an analog-digital conversion unit 22, a chromatic dispersion compensation processing unit 23, an adaptive equalization processing unit 24, a phase compensation unit 25, a frequency offset compensation unit 26, and an error correction unit 27.

The analog-digital conversion unit 22 quantizes the electric analog signal output from the coherent optical reception unit 20 and converts it into a digital signal. The chromatic dispersion compensation processing unit 23 takes in the digital signal output from the analog-digital conversion unit 22 as a reception signal, and performs chromatic dispersion compensation on the taken reception signal.

The adaptive equalization processing unit 24 performs adaptive equalization processing on the reception signal subjected to the chromatic dispersion compensation. The phase compensation unit 25 performs compensation on a phase offset generated between light sources of a transmitter and a receiver. The frequency offset compensation unit 26 performs compensation on a frequency offset generated between the light sources of the transmitter and the receiver.

The error correction unit 27 performs error correction on the reception signal output from the frequency offset compensation unit 26 based on an error correction code scheme. Then, the error correction unit 27 outputs the error-corrected reception signal, that is, reception information corresponding to the transmission information to the outside.

In the configuration of the digital signal processing unit 21, the chromatic dispersion compensation processing unit 23, the adaptive equalization processing unit 24, the phase compensation unit 25, the frequency offset compensation unit 26, and the error correction unit 27 subsequent to the analog-digital conversion unit 22 are not disposed in this order, but may be disposed in order defined arbitrarily.

Figure 2:
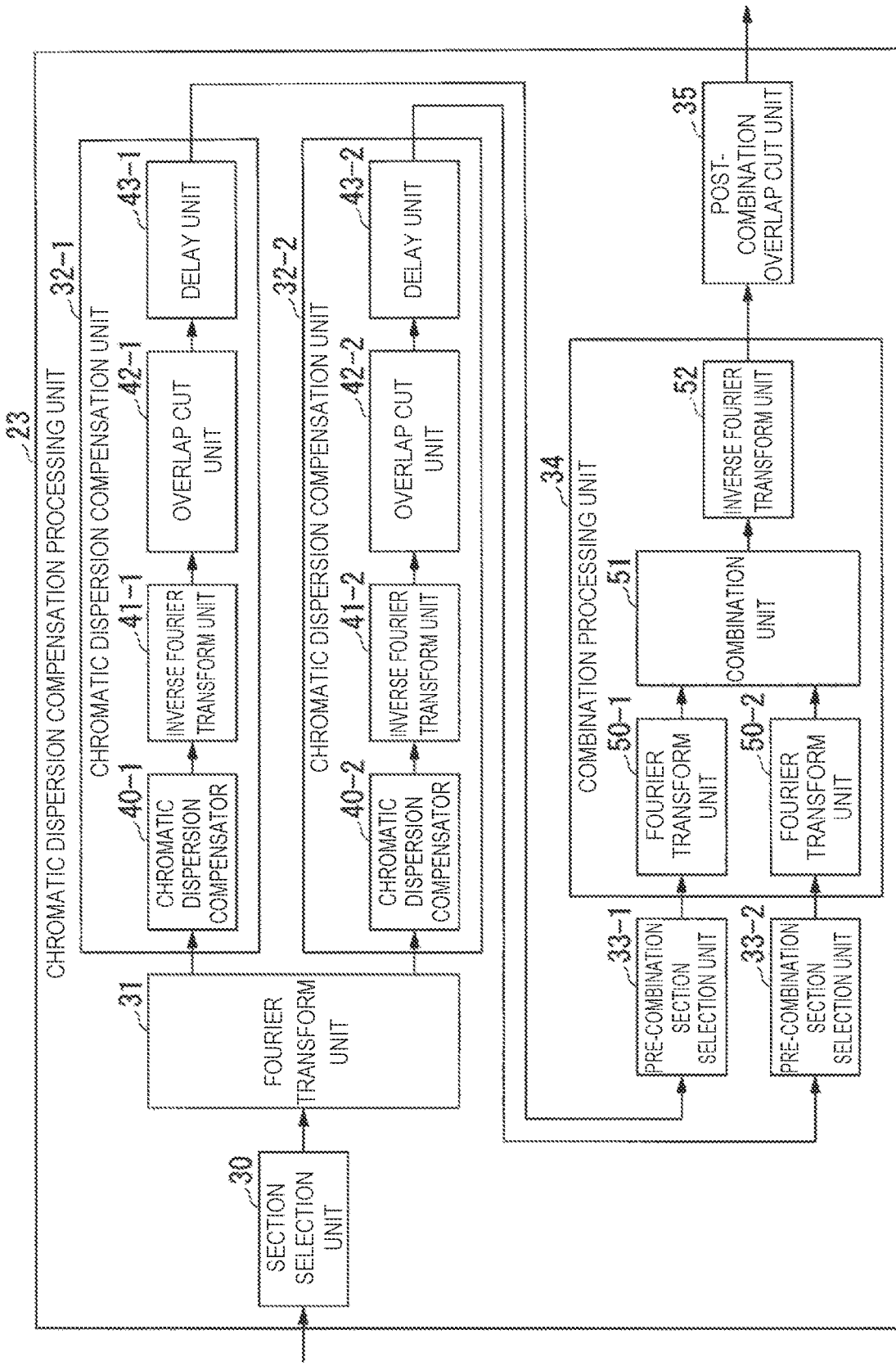
FIG. 2 is a block diagram showing a configuration of a chromatic dispersion compensation processing unit according to the first embodiment.

FIG. 2 is a block diagram showing an internal configuration of the chromatic dispersion compensation processing unit 23. The chromatic dispersion compensation processing unit 23 includes a section selection unit 30, a Fourier transform unit 31, chromatic dispersion compensation units 32-1 and 32-2, pre-combination section selection units 33-1 and 33-2, a combination processing unit 34, and a post-combination overlap cut unit 35. Comparing with the function units included in the chromatic dispersion compensation processing unit 412a shown in FIG. 20, the section selection unit 30 is a function unit corresponding to the section selection unit 800, the Fourier transform unit 31 is a function unit corresponding to the Fourier transform unit 801, the chromatic dispersion compensation units 32-1 and 32-2 are function units corresponding to the chromatic dispersion compensation units 802-1 and 802-2, respectively, and the combination processing unit 34 is a function unit corresponding to the combination processing unit 803. In other words, the chromatic dispersion compensation processing unit 23 shown in FIG. 2 differs from the chromatic dispersion compensation processing unit 412a shown in FIG. 20 in terms of including the pre-combination section selection units 33-1 and 33-2 and the post-combination overlap cut unit 35.

The section selection unit 30 takes in the digital signal output from the analog-digital conversion unit 22 as a reception signal. In addition, the section selection unit 30 selects, for the taken reception signal, a section in which an overlapping part determined based on a length of the overlap part, which is predetermined between adjacent sections in time-series order, is generated. Further, the section selection unit 30 sequentially outputs processing blocks including the partial reception signals selected from the entire reception signals by the selected section to the Fourier transform unit 31.

The Fourier transform unit 31 transforms, for example, for each of the processing blocks output from the section selection unit 30 by a fast Fourier transform (hereinafter, also referred to as FFT), a time-domain reception signal included in the processing block into a frequency-domain reception signal. In addition, the Fourier transform unit 31 divides the processing block including the transformed frequency-domain reception signal to form division processing blocks. For example, the processing block is divided into two frequency bands of a positive frequency band and a negative frequency band, based on a center frequency. Further, the Fourier transform unit 31 outputs one of the division processing blocks divided into the two frequency bands to the chromatic dispersion compensation unit 32-1, and outputs the other division processing block to the chromatic dispersion compensation unit 32-2.

Each of the chromatic dispersion compensation units 32-1 and 32-2 includes chromatic dispersion compensators 40-1 and 40-2, inverse Fourier transform units 41-1 and 41-2, overlap cut units 42-1 and 42-2, and delay units 43-1 and 43-2. The chromatic dispersion compensators 40-1 and 40-2, the inverse Fourier transform units 41-1 and 41-2, the overlap cut units 42-1 and 42-2, and the delay units 43-1 and 43-2 are function units corresponding to the chromatic dispersion compensators 812-1 and 812-2, the inverse Fourier transform units 813-1 and 813-2, the overlap cut units 814-1 and 814-2, and the delay units 815-1 and 815-2 shown in FIG. 20, respectively.

The chromatic dispersion compensator 40-1 takes in the division processing block of the positive frequency band output from the Fourier transform unit 31, for example. On the other hand, the chromatic dispersion compensator 40-2 takes in the division processing block of the negative frequency band output from the Fourier transform unit 31, for example. Conversely, the chromatic dispersion compensator 40-1 may take in the division processing block of the negative frequency band, and the chromatic dispersion compensator 40-2 may take in the division processing block of the positive frequency band.

Figure 20:
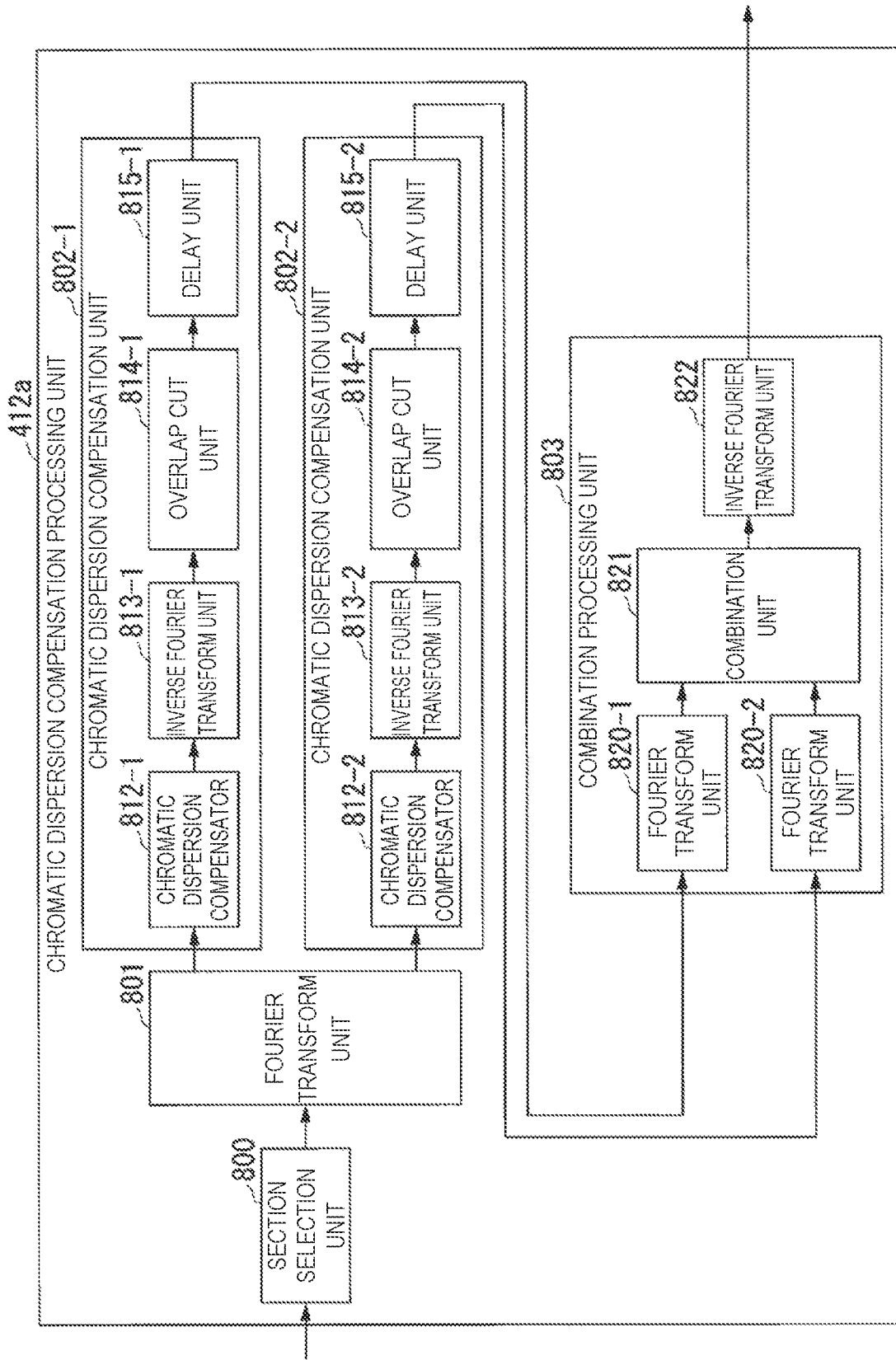
FIG. 20 is a block diagram showing an example of a configuration of the chromatic dispersion compensation processing unit.

In addition, similarly to the chromatic dispersion compensators 812-1 and 812-2 shown in FIG. 20, the chromatic dispersion compensators 40-1 and 40-2 perform chromatic dispersion compensation by multiplying the division processing blocks of the corresponding frequency bands by an inverse transfer function with centers of the frequency bands as a phase rotation axis. Here, the inverse transfer function is a transfer function having an inverse characteristic of chromatic dispersion undergone while the optical signal propagates through the optical fiber of the optical transmission line 3, and is a function approximated by a quadratic function. For example, an inverse transfer function approximated by a quadratic function having a phase rotation axis 900 shown in step S202 in FIG. 21 is applied to the chromatic dispersion compensator 40-1. An inverse transfer function approximated by a quadratic function having a phase rotation axis 901 is applied to the chromatic dispersion compensator 40-2.

The inverse Fourier transform units 41-1 and 41-2 use, for example, an inverse fast Fourier transform (hereinafter, also referred to as IFFT), to transform the reception signals included in the division processing blocks subjected to the chromatic dispersion compensation by the chromatic dispersion compensators 40-1 and 40-2 into time-domain reception signals, respectively.

Each of the overlap cut units 42-1 and 42-2 removes an overlap part having a predetermined length from both ends of the division processing block including the time-domain reception signal inverse output from each of the Fourier transform units 41-1 and 41-2. The delay units 43-1 and 43-2 give a delay to the division processing block, from which the overlap part is removed, for each of the frequency bands, eliminate the shift caused by the chromatic dispersion effect, and adjust a timing on a time axis. In addition, the delay units 43-1 and 43-2 output the reception signal included in the division processing block whose timing is adjusted, as a continuous signal sequence.

Figure 3:
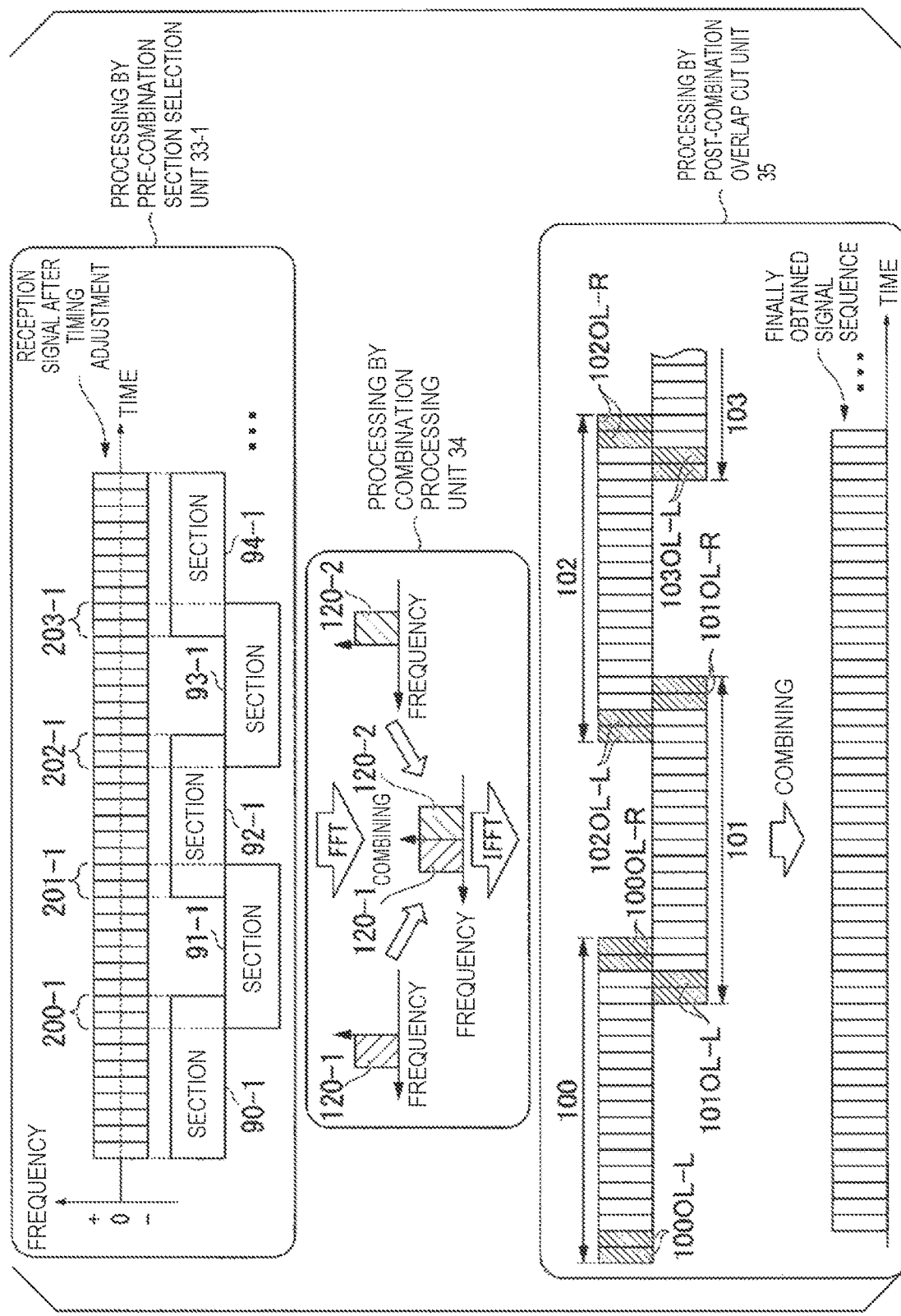
FIG. 3 is a diagram illustrating configurations of a pre-combination section selection unit, a combination processing unit, and a post-combination overlap cut unit according to the first embodiment.

The pre-combination section selection unit 33-1 takes in the signal sequence of the reception signal output from the delay unit 43-1 as shown in FIG. 3, for example. In addition, the pre-combination section selection unit 33-1 selects, for the taken reception signals, sections 90-1, 91-1, 92-1, 93-1, 94-1, ... in which overlapping parts 200-1, 201-1, 202-1, 203-1, ... having a predetermined length between adjacent sections in time-series order are generated. Further, the pre-combination section selection unit 33-1 sequentially outputs division processing blocks 100-1, 101-1, 102-1, 103-1, ... including the partial reception signals selected from the entire reception signals by the selected sections 90-1, 91-1, 92-1, 93-1, ... to the Fourier transform unit 50-1.

Similarly to the pre-combination section selection unit 33-1, the pre-combination section selection unit 33-2 also takes in the signal sequence of the reception signal output from the delay unit 43-2. In addition, the pre-combination section selection unit 33-2 selects, for the taken reception signal, sections 90-2, 91-2, 92-2, 93-2, 94-2, ... in which overlapping parts 200-2, 201-2, 202-2, 203-2, ... having a predetermined length between adjacent sections in time-series order are generated. Further, the pre-combination section selection unit 33-2 sequentially outputs division processing blocks 100-2, 101-2, 102-2, 103-2, ... including the partial reception signals selected from the entire reception signals according to the selected sections 90-2, 91-2, 92-2, 93-2, ... to the Fourier transform unit 50-2.

The combination processing unit 34 includes Fourier transform units 50-1 and 50-2, a combination unit 51, and an inverse Fourier transform unit 52. The Fourier transform units 50-1 and 50-2, the combination unit 51, and the inverse Fourier transform unit 52 as function units corresponding to the Fourier transform units 820-1 and 820-2, the combination unit 821, and the inverse Fourier transform unit 822 shown in FIG. 20, respectively.

Each of the Fourier transform units 50-1 and 50-2 uses the FFT to transform time-domain reception signals included in the division processing blocks 100-1 and 100-2, 101-1 and 101-2, . . . output from the respective pre-combination section selection units 33-1 and 33-2 into frequency-domain reception signals.

FIG. 3 shows an example in which each of the Fourier transform units 50-1 and 50-2 uses the FFT to transform time-domain reception signals included in the division processing blocks 100-1 and 100-2 output from the pre-combination section selection units 33-1 and 33-2 into frequency-domain reception signals 120-1 and 120-2.

The combination unit 51 combines the reception signals 120-1 and 120-2 corresponding to the division processing blocks 100-1 and 100-2 output from the Fourier transform units 50-1 and 50-2, respectively, to be continuous on a frequency axis, and then generates a processing block 100. Similarly, the combination unit 51 combines the division processing blocks 101-1 and 101-2, 102-1 and 102-2, . . . including the frequency-domain reception signals to generate processing blocks 101, 102, . . . .

The inverse Fourier transform unit 52 uses the IFFT to transform the reception signals included in the processing blocks 100, 101, . . . combined and generated by the combination unit 51 into time-domain reception signals and to output the signals.

The post-combination overlap cut unit 35 removes overlap parts 100OL-L, 100OL-R, 101OL-L, 101OL-R, . . . having a predetermined length from both ends of the processing blocks 100, 101, . . . output from the inverse Fourier transform unit 52. The post-combination overlap cut unit 35 combines the reception signals, from which the overlap parts 100OL-L, 100OL-R, 101OL-L, 101OL-R, . . . are removed, so as to form a continuous signal sequence, and outputs the signals to the adaptive equalization processing unit 24.

For example, in the example shown in FIG. 3, it is assumed that the lengths of the overlap parts are predetermined as one box at both ends of each of the division processing blocks 100-1 and 100-2, 101-1 and 101-2, . . . . It is assumed that lengths of overlapping parts 200-1 and 200-2, 201-1 and 201-2, . . . when the pre-combination section selection units 33-1 and 33-2 select sections 90-1 and 90-2, 91-1 and 91-2, . . . are predetermined in two boxes based on the lengths of the overlap parts. In addition, it is assumed that 10 boxes are predetermined as lengths of the sections 90-1 and 90-2, 91-1 and 91-2, . . . .

For example, since the division processing block 100-1 and the division processing block 100-2 are combined by the combination processing of the combination processing unit 34, the size of the processing block 100 generated by the combination becomes a length of 20 boxes which are twice the length of the division processing blocks 100-1 and 100-2.

Further, an overlapping part 200 formed by the combination of the overlapping part 200-1 of the division processing block 100-1 and the overlapping part 200-2 of the division processing block 100-2 also becomes four boxes that are twice the size of the overlapping parts 200-1 and 200-2. In addition, the overlap parts 100OL-L and 100OL-R of the processing block 100 also becomes two boxes that are twice the size of the division processing blocks 100-1 and 100-2. Accordingly, the post-combination overlap cut unit 35 removes the overlap parts having a length of two boxes from both ends of the processing blocks 100, 101, . . . .

(Processing to be performed by Chromatic Dispersion Compensation Processing Unit of First Embodiment)

Figure 4:
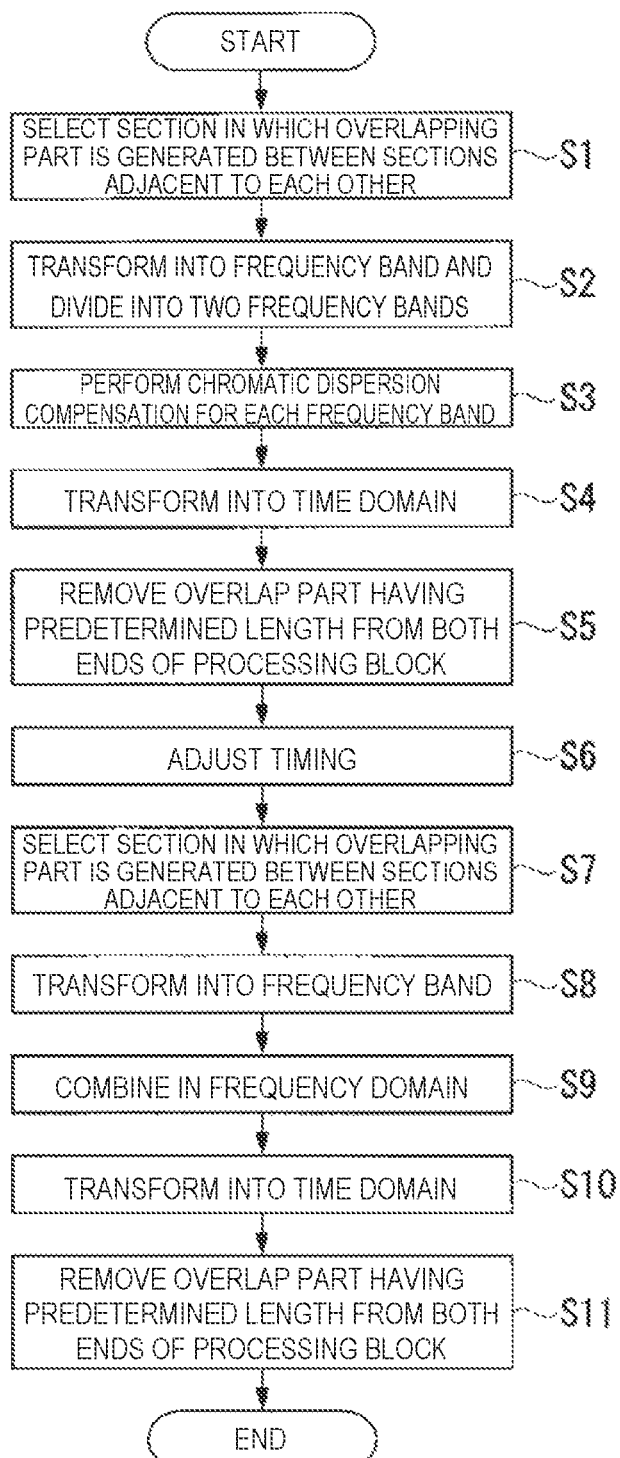
FIG. 4 is a flowchart showing a flow to be processed by the chromatic dispersion compensation processing unit according to the first embodiment.

Processing of the chromatic dispersion compensation processing unit 23 according to the first embodiment will be described below with reference to FIGS. 4 to 9. FIG. 4 is a flowchart showing a processing flow of the chromatic dispersion compensation processing unit 23 according to the first embodiment. FIG. 5 is a diagram summarizing the number of processing samples, which are the number of samples to be processed by each of the function units of the chromatic dispersion compensation processing unit 23, and the contents of processing of each of the function units.

The section selection unit 30 takes in the digital signal output from the analog-digital conversion unit 22 as a reception signal. The section selection unit 30 selects, for the reception signal that has been taken in, section in which an overlapping part having a predetermined length is generated between adjacent sections in time-series order (step S1).

A specific example of processing to be performed by the section selection unit 30 will be described with reference to FIG. 6. Here, it is assumed that the length of the overlap part is predetermined as "256" samples. For this reason, the length of "512" samples is predetermined for the section selection unit 30, as a length of an overlapping part determined based on the length of the overlap part. As a length of the section, "1024" samples, which are the number of blocks to be processed by the Fourier transform unit 31, are predetermined. In addition, a length of "128" samples is predetermined for each of the overlap cut units 42-1 and 42-2, as a length of the overlap part to be removed. In FIG. 6, note that one box of the reception signal includes "64" samples.

As shown in FIG. 6, the section selection unit 30 selects sections 60, 61, 62, 63, . . . each having "1024" samples, that is, a length of 16 boxes for the reception signal. The sections 60, 61, 62, 63, . . . include overlapping parts 80, 81, 82, 83, . . . each having "512" samples, that is, a length of 8 boxes, respectively, between adjacent sections.

Figure 7:
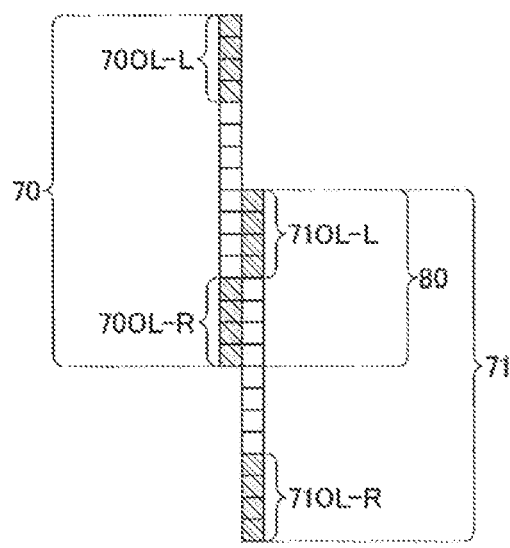
FIG. 7 is a diagram showing a relation between overlapping parts and overlap parts of processing blocks obtained by section selection of the section selection unit according to the first embodiment.

For example, in a processing block 70 including partial reception signals selected from all of the reception signals according to the section 60, a relation between the overlapping part 80 and overlap parts 70OL-L and 70OL-R of the processing block 70 is as shown in FIG. 7. In a processing block 71 including partial reception signals selected from all of the reception signals according to the section 61, a relation between the overlapping part 80 and overlap parts 71OL-L and 71OL-R of the processing block 71 is as shown in FIG. 7.

In FIG. 7, a length of each of the overlap parts 70OL-L, 70OL-R, 71OL-L, and 71OL-R is indicated as "256" samples, that is, a length of 4 boxes. In the other processing blocks 72, 73, . . . , relations between the overlapping parts 81, 82, 83, . . . and overlap parts 72OL-L, 72OL-R, 73OL-L, and 73OL-R, . . . are similar to the relation shown in FIG. 7.

The section selection unit 30 sequentially outputs the processing blocks 70, 71, 72, 73, . . . including partial reception signals selected from the entire reception signals according to the selected sections 60, 61, 62, 63, . . . to the Fourier transform unit 31. As shown in FIG. 5, the number of processing samples of the section selection unit 30 is "512", which is a total of the lengths of the overlap parts at both ends of the processing blocks 70, 71, 72, 73, . . . .

The Fourier transform unit 31 uses the FFT for each of the processing blocks 70, 71, 72, 73, . . . to transform a time-domain reception signal included in each of the processing blocks 70, 71, 72, 73, . . . into a frequency-domain reception signal. The Fourier transform unit 31 divides each of the processing blocks 70, 71, 72, 73, . . . including the transformed frequency-domain reception signal into two frequency bands, that is, each of the processing blocks 70, 71, 72, 73, . . . being divided into division processing blocks 70-1 and 70-2, 71-1 and 71-2, 72-1 and 72-2, 73-1 and 73-2, . . . .

The number of samples in each of the division processing blocks 70-1 and 70-2, 71-1 and 71-2, 72-1 and 72-2, 73-1 and 73-2, . . . is "512" which is half the number of samples in the processing blocks 70, 71, 72, 73, . . . . The size of one box in each of the division processing blocks 70-1, 71-1, 72-1, 73-1, . . . to be processed by the chromatic dispersion compensator 40-1 shown in FIG. 6 is twice the size of the box in each of the processing blocks 70, 71, 72, 73, . . . , but the number of samples per box is "64".

The Fourier transform unit 31 outputs, for example, the division processing blocks 70-1, 71-1, 72-1, 73-1, . . . to the chromatic dispersion compensation unit 32-1. The Fourier transform unit 31 outputs, for example, the division processing blocks 70-2, 71-2, 72-2, 73-2, . . . to the chromatic dispersion compensation unit 32-2 (step S2). The number of samples to be processed by the Fourier transform unit 31 is "1204" which is the number of samples to be processed once by the FFT as shown in FIG. 5.

The chromatic dispersion compensator 40-1 multiplies the frequency-domain reception signal included in each of the division processing blocks 70-1, 71-1, 72-1, 73-1, . . . by an inverse transfer function with the center of the frequency band common to the division processing blocks 70-1, 71-1, 72-1, 73-1, . . . as the phase rotation axis to perform chromatic dispersion compensation. Similarly, the chromatic dispersion compensator 40-2 multiplies the frequency-domain reception signal included in each of the division processing blocks 70-2, 71-2, 72-2, 73-2, . . . by an inverse transfer function with the center of the frequency band common to the division processing blocks 70-2, 71-2, 72-2, 73-2, . . . as the phase rotation axis to perform chromatic dispersion compensation (step S3). Since the division processing blocks 70-1 and 70-2, 71-1 and 71-2, 72-1 and 72-2, 73-1 and 73-2, . . . are processed by the chromatic dispersion compensators 40-1 and 40-2, respectively, the number of processing samples is "512" as shown in FIG. 5.

The inverse Fourier transform unit 41-1 uses the IFFT to transform the frequency-domain reception signals included in the processing blocks 70-1, 71-1, 72-1, 73-1, . . . subjected to the chromatic dispersion compensation by the chromatic dispersion compensator 40-1 into time-domain reception signals. Similarly, the inverse Fourier transform unit 41-2 uses the IFFT to transform the frequency-domain reception signals included in the processing blocks 70-2, 71-2, 72-2, 73-2, . . . subjected to the chromatic dispersion compensation by the chromatic dispersion compensator 40-2 into time-domain reception signals (step S4). The number of processing samples of the inverse Fourier transform units 41-1 and 41-2 is "512" which is the same as that of the chromatic dispersion compensators 40-1 and 40-2, as shown in FIG. 5.

The overlap cut units 42-1 and 42-2 removes predetermined "128" samples, that is, the overlap part of two boxes from both ends of each of the division processing blocks 70-1 and 70-2, 71-1 and 71-2, 72-1 and 72-2, 73-1 and 73-2, . . . transformed into the time-domain reception signal output from the inverse Fourier transform units 41-1 and 41-2.

For example, regarding the division processing block 70-1, each of the overlap parts 70OL-L and 70OL-R included in the processing block 70 before division has a length of 4 boxes, that is, a length of "256" samples as shown in FIG. 7. By the division into two frequency bands by the Fourier transform unit 31, the overlap part 70OL-L is divided into overlap parts 70OL-1-L and 70OL-2-L of "128" samples which are half the length. In addition, similarly, the overlap part 70OL-R is divided into overlap parts 70OL-1-R and 70OL-2-R of "128" samples which are half the length.

The overlap parts 70OL-1-L and the overlap part 70OL-1-R divided on one side are the overlap part of the division processing block 70-1. The overlap part 70OL-2-L and the overlap part 70OL-2-R divided on the other side are the overlap part of the division processing block 70-2.

Similarly, regarding the division processing blocks 71-1, 72-1, . . . , the overlap part has half the length. Therefore, as shown in FIG. 6, the overlap cut unit 42-1 removes the overlap parts 70OL-1-L, 70OL-1-R, 71OL-1-L, 71OL-1-R, 72OL-1-L, 72OL-1-R, 73OL-1-L, 73OL-1-R, . . . of two boxes from both ends of the division processing blocks 70-1, 71-1, 72-1, 73-1, . . . .

Similarly, the overlap cut unit 42-2 also removes the overlap parts 70OL-2-L, 70OL-2-R, 71OL-2-L, 71OL-2-R, 72OL-2-L, 72OL-2-R, 73OL-2-L, 73OL-2-R, . . . of two boxes from both ends of the division processing blocks 70-2, 71-2, 72-2, 73-2, . . . (step S5). Note that the number of processing samples of the overlap cut units 42-1 and 42-2 is a total value of the lengths of the overlap parts to be removed from both ends of one division processing block, and is "256" samples, which are twice the "128" samples, as shown in FIG. 5.

The overlap cut unit 42-1 outputs the division processing blocks 70-1, 71-1, 72-1, 73-1, . . . , in which the overlap part is removed, to the delay unit 43-1. In addition, the overlap cut unit 42-2 also outputs the division processing blocks 70-2, 71-2, 72-2, 73-2, . . . , in which the overlap part is removed, to the delay unit 43-2.

The delay unit 43-1 gives a delay to each of the division processing blocks 70-1, 71-1, 72-1, 73-1, . . . , in which the overlap part is removed, output from the overlap cut unit 42-1, and adjusts a timing on a time axis as shown in FIG. 6. The delay unit 43-1 outputs the reception signals included in the division processing blocks 70-1, 71-1, 72-1, 73-1, . . . whose timings are adjusted, as a continuous signal sequence.

Similarly, the delay unit 43-2 gives a delay to each of the division processing blocks 70-2, 71-2, 72-2, 73-2, . . . , in which the overlap part is removed, output from the overlap cut unit 42-2, and adjusts a timing on a time axis. The delay unit 43-2 outputs the reception signals included in the division processing blocks 70-2, 71-2, 72-2, 73-2, . . . whose timings are adjusted, as a continuous signal sequence (step S6). As shown in FIG. 5, the number of processing samples of the delay units 43-1 and 43-2 is the number of samples included in the one division processing block, in which the overlap part is removed, that is, "256" samples.

Processing to be performed by the pre-combination section selection units 33-1 and 33-2 will be described below. Here, it is assumed that the length of the overlap part is predetermined as "64" samples. For this reason, the length of "128" samples is predetermined for each of the pre-combination section selection units 33-1 and 33-2, as a length of an overlapping part, and as a length of the section, a length of "256" samples, which are the length of each of the division processing blocks 70-1 and 70-2, 71-1 and 71-2, 72-1 and 72-2, 73-1 and 73-2, . . . , in which the overlap part is removed, is predetermined. In addition, a length of "128" samples is predetermined for the post-combination overlap cut unit 35, as a length of the overlap part to be removed.

Figure 8:
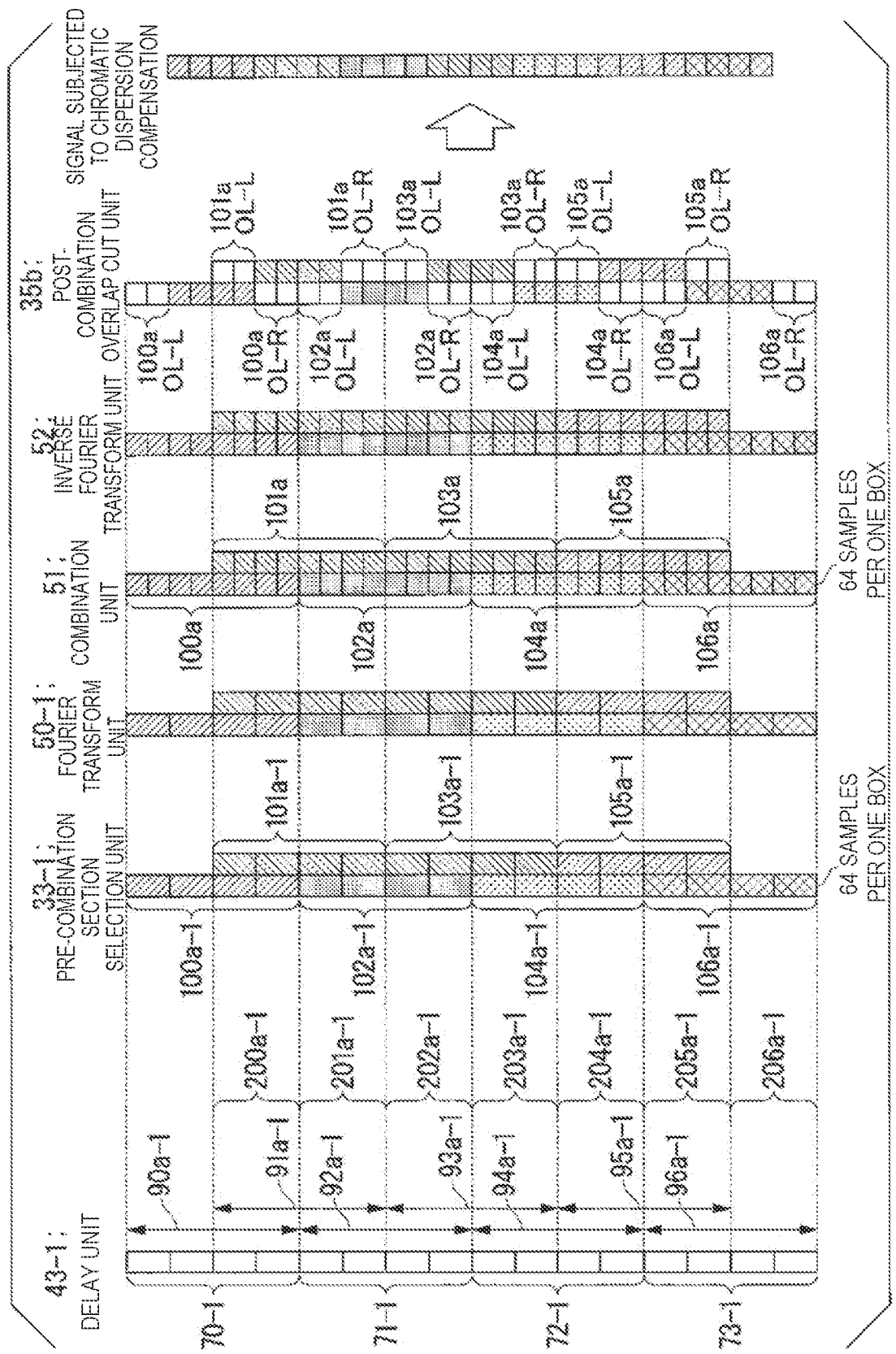
FIG. 8 is another diagram showing changes in a reception signal due to processing of the respective function units of the chromatic dispersion compensation processing unit according to the first embodiment.

As shown in FIG. 8, the pre-combination section selection unit 33-1 selects sections 90a-1, 91a-1, 92a-1, 93a-1, 94a-1, 95a-1, 96a-1, . . . each having a length of "256" samples for the signal sequence of the reception signal output from the delay unit 43-1.

The sections 90a-1, 91a-1, 92a-1, 93a-1, 94a-1, 95a-1, 96a-1, . . . include overlapping parts 200a-1, 201a-1, 202a-1, 203a-1, 204a-1, 205a-1, 206a-1, . . . each having "128" samples, respectively, between adjacent sections.

Figure 9:
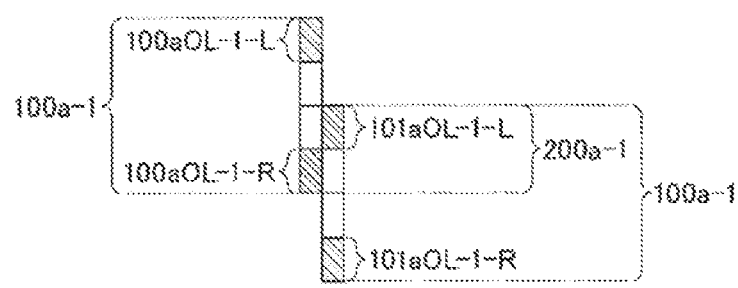
FIG. 9 is a diagram showing a relation between overlapping parts and overlap parts of division processing blocks obtained by section selection of the pre-combination section selection unit according to the first embodiment.

For example, in a division processing block 100a-1 including the reception signal selected by the section 90a-1, a relation between the overlapping part 200a-1 and overlap parts 100aOL-1-L and 100aOL-1-R of the division processing block 100a-1 is as shown in FIG. 9. In a division processing block 101a-1 including the reception signal selected by the section 91a-1, a relation between the overlapping part 200a-1 and overlap parts 101aOL-1-L and 101aOL-1-R of the division processing block 101a-1 is as shown in FIG. 9.

In FIG. 9, a length of each of the overlap parts 100aOL-1-L, 100aOL-1-R, 101aOL-1-L, and 101aOL-1-R is indicated as "64" samples, that is, a length of one box. In the other division processing blocks 102a-1, 103a-1, 104a-1, 105a-1, 106a-1, . . . , a relation between each of the overlapping parts 201a-1, 202a-1, 203a-1, 204a-1, 205a-1, 206a-1, . . . and each of the overlap parts 102aOL-1-L, 102aOL-1-R, 103aOL-1-L, 103aOL-1-R, 104aOL-1-L, 104aOL-1-R, 105aOL-1-L, 105aOL-1-R, 106aOL-1-L, 106aOL-1-R, . . . is similar to the relation shown in FIG. 9.

The pre-combination section selection unit 33-1 sequentially outputs the division processing blocks 100a-1, 101a-1, 102a-1, 103a-1, 104a-1, 105a-1, 106a-1, . . . including partial reception signals selected from the entire reception signals according to the selected sections 90a-1, 91a-1, 92a-1, 93a-1, 94a-1, 95a-1, 96a-1, . . . to the Fourier transform unit 50-1.

Similarly, the pre-combination section selection unit 33-2 selects sections 90a-2, 91a-2, 92a-2, 93a-2, 94a-2, 95a-2, 96a-2, . . . each having a length of "256" samples for the signal sequence of the reception signal output from the delay unit 43-2. The pre-combination section selection unit 33-2 sequentially outputs the division processing blocks 100a-2, 101a-2, 102a-2, 103a-2, 104a-2, 105a-2, 106a-2, . . . including partial reception signals selected from the entire reception signals according to the selected sections 90a-2, 91a-2, 92a-2, 93a-2, 94a-2, 95a-2, 96a-2, . . . to the Fourier transform unit 50-2 (step S7). As shown in FIG. 5, the number of processing samples of the pre-combination section selection units 33-1 and 33-2 is "128" samples, which are a total of the lengths of the overlap parts at both ends of the division processing blocks 100a-1 and 100a-2, . . . .

The Fourier transform unit 50-1 uses the FFT to transform the time-domain reception signals included in the division processing blocks 100 a-1, 101 a-1, 102a-1, 103a-1, 104a-1, 105a-1, 106a-1, . . . output from the pre-combination section selection unit 33-1 into frequency-domain reception signals. Similarly, the Fourier transform unit 50-2 uses the FFT to transform the time-domain reception signals included in the division processing blocks 100a-2, 101a-2, 102a-2, 103a-2, 104a-2, 105a-2, 106a-2, . . . output from the pre-combination section selection unit 33-2 into frequency-domain reception signals (step S8). The number of samples to be processed by the Fourier transform units 50-1 and 50-2 is "256" samples which are the number of samples to be processed once by the FFT as shown in FIG. 5.

The combination unit 51 combines the division processing block 100a-1 output from the Fourier transform unit 50-1 and the division processing block 100a-2 output from the Fourier transform unit 50-2 to be continuous on a frequency axis, and then generates a processing block 100a.

Similarly, the combination unit 51 combines the division processing blocks 101a-1, 102a-1, 103a-1, 104a-1, 105a-1, 106a-1, . . . output from the Fourier transform unit 50-1 and the division processing blocks 101a-2, 102a-2, 103a-2, 104a-2, 105a-2, 106a-2, . . . output from the Fourier transform unit 50-2, respectively, to be continuous on the frequency axis. Thus, the combination unit 51 generates processing blocks 101a, 102a, 103a, 104a, 105a, 106a, . . . (step S9). The number of processing samples of the combination unit 51 is "512" samples, which are the length of the post-combination processing blocks 100a, 101a, . . . , as shown in FIG. 5.

The number of samples in each of the processing blocks 100a, 101a, 102a, 103a, 104a, 105a, 106a, . . . is "512" samples which are twice the number of samples in each of the division processing blocks 100a-1 and 100a-2, 101a-1 and 101a-2, . . . . The size of one box in each of the processing blocks 100a, 101a, 102a, 103a, 104a, 105a, 106a, . . . to be processed by the combination unit 51 shown in FIG. 8 is half the size of the box in each of the division processing blocks 100a-1 and 100a-2, 101a-1 and 101a-2, . . . , but the number of samples per box is "64" samples.

The inverse Fourier transform unit 52 uses the IFFT to transform the reception signals included in the processing blocks 100a, 101a, 102a, 103a, 104a, 105a, 106a, . . . combined by the combination unit 51 into time-domain reception signals and outputs the reception signals (step S10). The number of processing samples of the inverse Fourier transform unit 52 is "512" samples which are the same as that of the combination unit 51, as shown in FIG. 5.

The length of the overlap part is doubled by the combination of the combination unit 51. For example, the overlap part 100aOL-L of the processing block 100a formed by the combination of the overlap part 100aOL-1-L of the division processing block 100a-1 and the overlap part 100aOL-2-L of the division processing block 100a-2 have a length of two boxes, that is, "128" samples.

As shown in FIG. 8, the post-combination overlap cut unit 35 removes overlap parts 100aOL-L, 100aOL-R, 101aOL-L, 101aOL-R, 102aOL-L, 102aOL-R, 103aOL-L, 103aOL-R, 104aOL-L, 104aOL-R, 105aOL-L, 105aOL-R, 106aOL-L, 106aOL-R, . . . having a length of two boxes from both ends of each of the processing blocks 100a, 101a, 102a, 103a, 104a, 105a, 106a, . . . transformed into the time-domain reception signal output from the inverse Fourier transform unit 52.

The post-combination overlap cut unit 35 combines the reception signals, from which the overlap parts 100aOL-L, 100aOL-R, 101aOL-L, 101aOL-R, . . . are removed, so as to form a continuous signal sequence, and outputs the signals to the adaptive equalization processing unit 24 (step S11). The number of processing samples of the post-combination overlap cut unit 35 is a total value of the lengths of the overlap parts to be removed from both ends of one processing block, and is "256" samples, which are twice the "128" samples, as shown in FIG. 5.

With the configuration of the first embodiment described above, the pre-combination section selection units 33-1 and 33-2 are provided for each frequency band, select, for the reception signal for each frequency band, the sections 90*a*-1 and 90*a*-2, . . . in which the overlapping parts 200*a*-1 and 200*a*-2, . . . determined based on the lengths of the overlap parts 100*a*OL-L, 100*a*OL-R, 101*a*OL-L, 101*a*OL-R, . . . determined in advance are generated between the sections 90*a*-1 and 90*a*-2 adjacent to each other in time-series order before the combination processing of the combination processing unit 34, and sequentially output the reception signal for each of the selected sections 90*a*-1 and 90*a*-2, . . . as division processing blocks 100*a*-1 and 100*a*-2, . . . . The post-combination overlap cut unit 35 removes the overlap part 100*a*OL-L, 100*a*OL-R, 101*a*OL-L, 101*a*OL-R, . . . from both ends of the processing blocks 100*a*, 101*a*, . . . generated by the combination of the division processing blocks 100*a*-1 and 100*a*-2, . . . so as to be continuous on the frequency axis by the combination processing to be performed by the combination processing unit 34.

More specifically, in the configuration of the first embodiment described above, the section selection unit 30 selects, for the reception signal obtained by reception of the optical signal with the coherent detection scheme, the sections 60, 61, . . . in which the overlapping parts 80, 81, . . . (first overlapping part) determined based on the overlap parts 70OL-L, 70OL-R, . . . (first overlap part) are generated between the sections 60, 61, . . . adjacent to each other in time-series order, and sequentially outputs the reception signals included in the selected sections 60, 61, . . . as the processing block 70, 71, . . . , respectively. The Fourier transform unit 31 transforms the reception signal for each of the processing blocks 70, 71, . . . output from the section selection unit 30 into the frequency domain, divides the processing blocks 70, 71, . . . including the reception signal transformed into the frequency domain into two frequency bands, and outputs the blocks as the division processing blocks 70-1 and 70-2, 71-1 and 71-2, . . . . The chromatic dispersion compensation units 32 *b*-1 and 32-*b*-2 are provided for each frequency band, performs the chromatic dispersion compensation on the division processing blocks 70-1 and 70-2, 71-1 and 71-2, . . . of the corresponding frequency bands, performs the inverse Fourier transform, and then performs the process of adjusting the timings of the division processing blocks 70-1 and 70-2, 71-1 and 71-2, . . . on the time axis.

The pre-combination section selection unit 33-1 and 33-2 arrange the division processing blocks 70-1 and 70-2, 71-1 and 71-2, . . . output from the chromatic dispersion compensation units 32*b*-1 and 32*b*-2 corresponding thereto in time-series order, and select the sections 90*a*-1 and 90*a*-2, 91*a*-1 and 91*a*-2, . . . in which the overlapping parts 200*a*-1 and 200*a*-2, 201*a*-1 and 201*a*-2, . . . (second overlapping part) determined based on the overlap parts 100*a*OL-1-L, 100*a*OL-1-R, . . . (second overlap part) are generated between the sections 90*a*-1 and 90*a*-2, 91*a*-1 and 91*a*-2, . . . adjacent to each other in time-series order, and sequentially output the reception signals included in the selected sections 90*a*-1 and 90*a*-2, 91*a*-1 and 91*a*-2, . . . as the division processing blocks 100*a*-1 and 100*a*-2, 101*a*-1 and 101*a*-2, . . . , respectively. The combination processing unit 34 combines the division processing blocks 100*a*-1 and 100*a*-2, 101*a*-1 and 101*a*-2, . . . output from the pre-combination section selection units 33-1 and 33-2, respectively, to be continuous on the frequency axis, and generates the processing blocks 100*a*, 101*a*, . . . . The post-combination overlap cut unit 35 removes the overlap parts 100*a*OL-L, 100*a*OL-R, 101*a*OL-L, 101*a*OL-R, . . . having a predetermined length from both ends of the processing blocks 100*a*, 101*a*, . . . . Thus, the post-combination overlap cut unit 35 can remove the distortion of the waveform generated at both ends of the output signal of the combination processing unit 34, and in the chromatic dispersion compensation processing involving the frequency band division processing, the deterioration of the signal quality caused by the division of the frequency band can be reduced.

Figure 10:
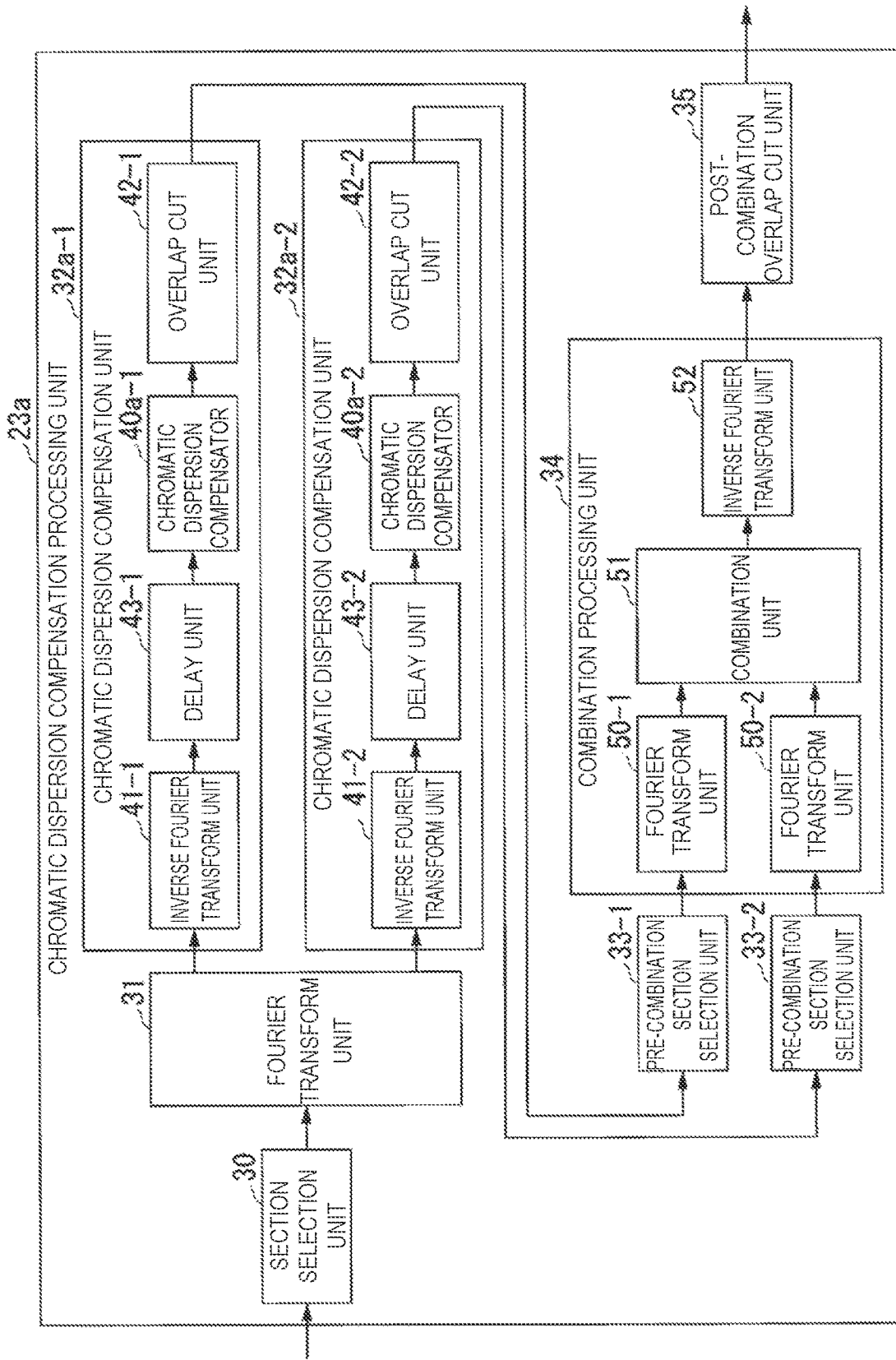
FIG. 10 is a diagram showing another configuration example of the chromatic dispersion compensation processing unit according to the first embodiment.

Instead of the chromatic dispersion compensation processing unit 23 shown in FIG. 2, a chromatic dispersion compensation processing unit 23*a* configured as shown in FIG. 10 may be applied. The chromatic dispersion compensation processing unit 23*a* includes chromatic dispersion compensation units 32*a*-1 and 32*a*-2 instead of the chromatic dispersion compensation units 32-1 and 32-2. The chromatic dispersion compensation units 32*a*-1 and 32*a*-2 include inverse Fourier transform units 41-1 and 41-2, delay units 43-1 and 43-2, chromatic dispersion compensators 40*a*-1 and 40*a*-2, and overlap cut units 42-1 and 42-2, respectively. The chromatic dispersion compensators 40-1 and 40-2 perform chromatic dispersion compensation by multiplying the inverse transfer function in the frequency domain, whereas the chromatic dispersion compensators 40*a*-1 and 40*a*-2 perform chromatic dispersion compensation in the time domain.

In the chromatic dispersion compensation processing unit 23*a* shown in FIG. 10, the delay units 43-1 and 43-2, the chromatic dispersion compensators 40*a*-1 and 40*a*-2, and the overlap cut units 42-1 and 42-2 may be arranged by arbitrary change.

In the chromatic dispersion compensation processing unit 23 shown in FIG. 2, the overlap cut units 42-1 and 42-2 and the delay units 43-1 and 43-2 may be arranged at any position as long as being arranged behind the inverse Fourier transform units 41-1 and 41-2, and the positions of the overlap cut units 42-1 and 42-2 and the delay units 43-1 and 43-2 may be interchanged. In addition, function units configured to perform another arithmetic operation may be respectively provided between the overlap cut units 42-1 and 42-2 and the delay units 43-1 and 43-2, or between the delay units 43-1 and 43-2 and the overlap cut units 42-1 and 42-2 whose positions are interchanged.

Second Embodiment

Figure 11:
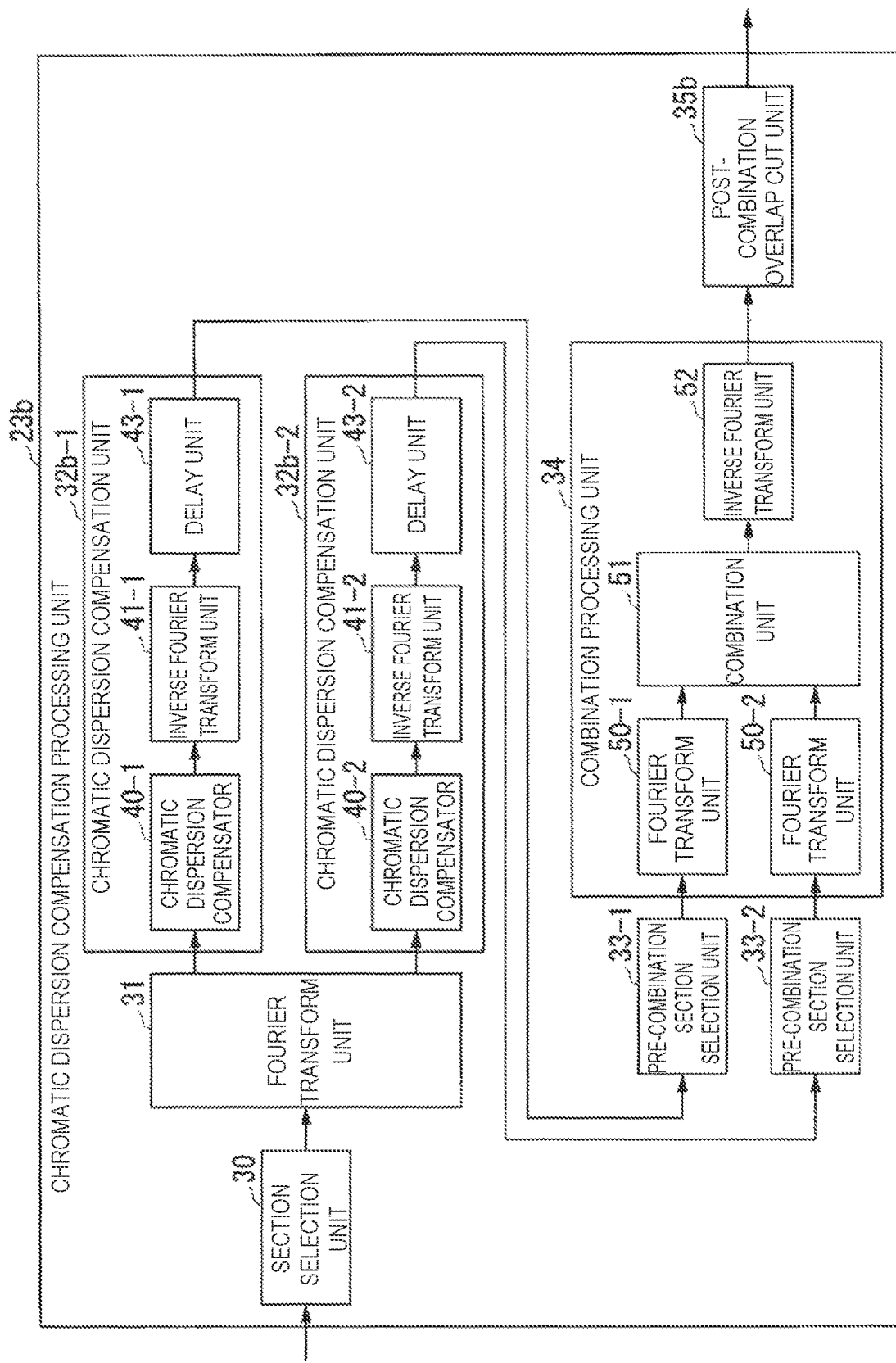
FIG. 11 is a block diagram showing a configuration of a chromatic dispersion compensation processing unit according to a second embodiment.

FIG. 11 is a block diagram showing an internal configuration of a chromatic dispersion compensation processing unit 23*b* according to a second embodiment. In the chromatic dispersion compensation processing unit 23*b*, the same components as those of the chromatic dispersion compensation processing unit 23 of the first embodiment are denoted by the same reference numerals, and different configurations will be described below. The chromatic dispersion compensation processing unit 23*b* is a function unit applied in place of the chromatic dispersion compensation processing unit 23 of the digital signal processing unit 21 in the optical reception device 2 shown in FIG. 1.

The chromatic dispersion compensation processing unit 23*b* includes a section selection unit 30, a Fourier transform unit 31, chromatic dispersion compensation units 32*b*-1 and 32*b*-2, pre-combination section selection units 33-1 and 33-2, a combination processing unit 34, and a post-combination overlap cut unit 35*b*.

The chromatic dispersion compensation units 32b-1 and 32b-2 include chromatic dispersion compensators 40-1 and 40-2, inverse Fourier transform units 41-1 and 41-2, and delay units 43-1 and 43-2, respectively. The chromatic dispersion compensation units 32b-1 and 32b-2 are similar to the chromatic dispersion compensation units 32-1 and 32-2 according to the first embodiment except for not including the overlap cut units 42-1 and 42-2.

The post-combination overlap cut unit 35b collectively removes the overlap parts removed by the overlap cut units 42-1 and 42-2 of the chromatic dispersion compensation units 32-1 and 32-2 in the first embodiment and the overlap parts removed by the post-combination overlap cut unit 35 in the first embodiment.

(Processing to be performed by Chromatic Dispersion Compensation Processing Unit of Second Embodiment)

Figure 12:
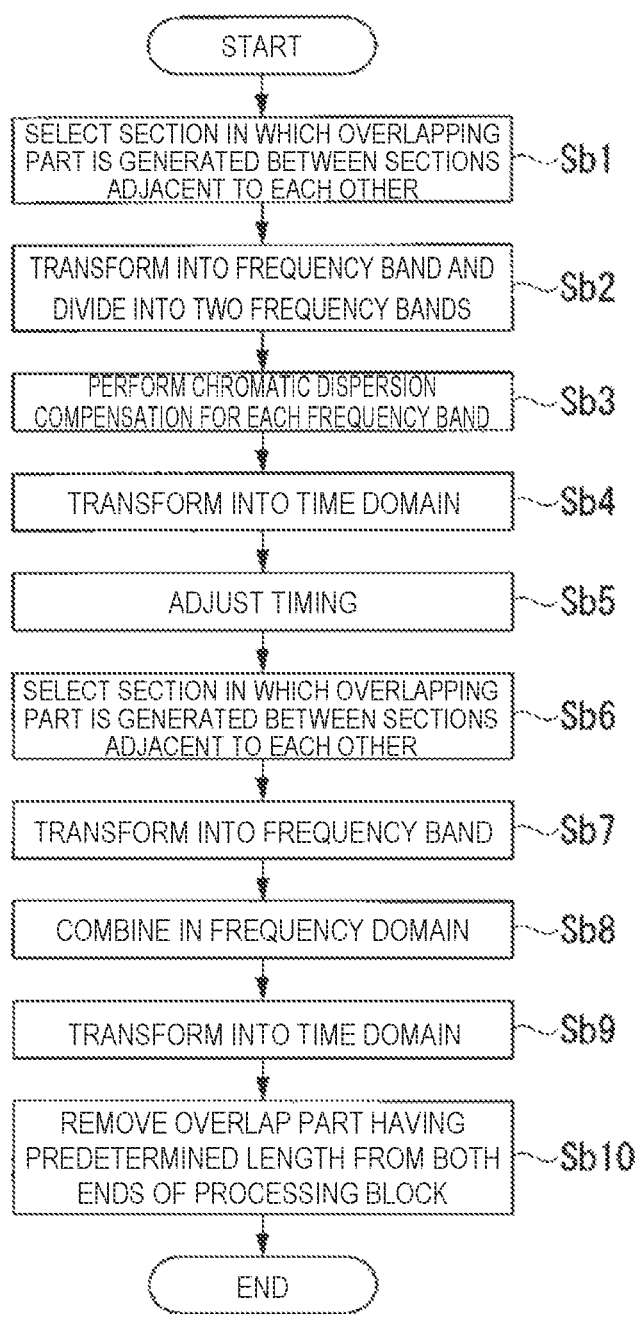
FIG. 12 is a flowchart showing a flow to be processed by the chromatic dispersion compensation processing unit according to the second embodiment.

Processing of the chromatic dispersion compensation processing unit 23b according to the second embodiment will be described below with reference to FIGS. 12 to 14. FIG. 12 is a flowchart showing a processing flow of the chromatic dispersion compensation processing unit 23b according to the second embodiment.

Processes of steps Sb1 to step Sb4 are the same as those of steps S1 to S4 in the processing of the first embodiment shown in FIG. 4, and are performed by the section selection unit 30, the Fourier transform unit 31, the chromatic dispersion compensators 40-1 and 40-2, the inverse Fourier transform units 41-1 and 41-2.

Figure 13:
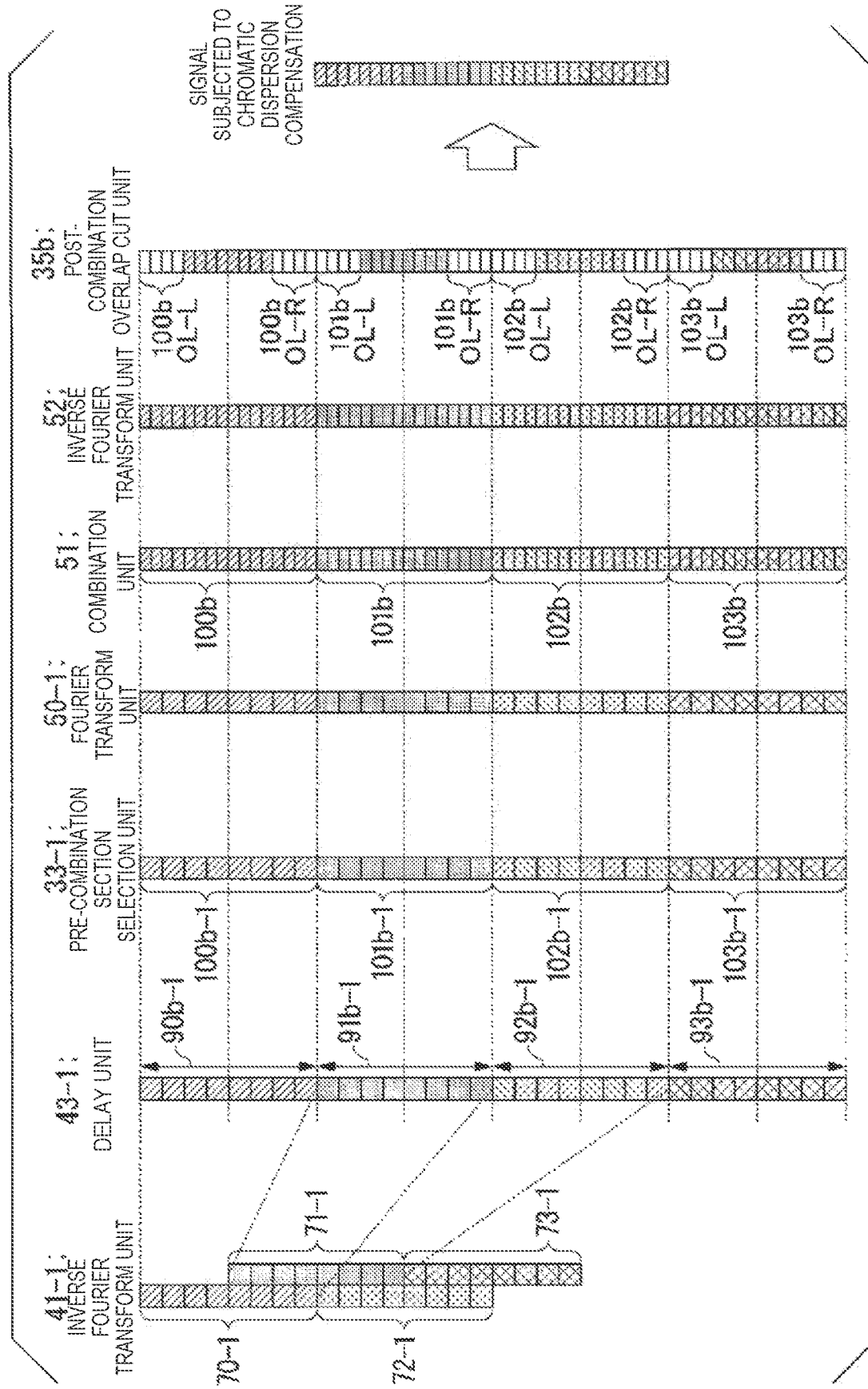
FIG. 13 is a diagram showing changes in a reception signal due to processing of respective function units of the chromatic dispersion compensation processing unit according to the second embodiment.
Figure 14:
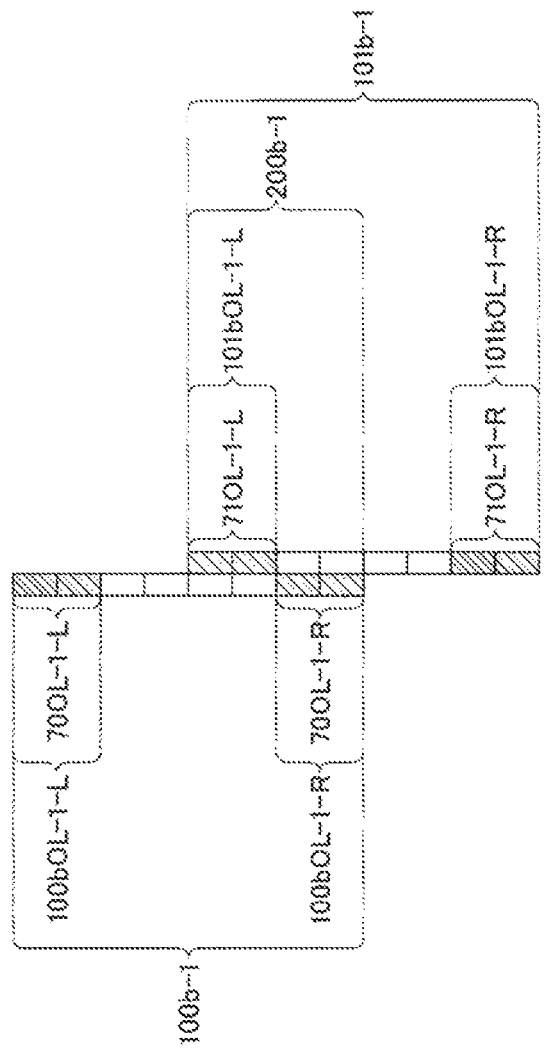
FIG. 14 is a diagram showing a relation between overlapping parts and overlap parts of division processing blocks obtained by section selection of a pre-combination section selection unit according to the second embodiment.
Figure 15:
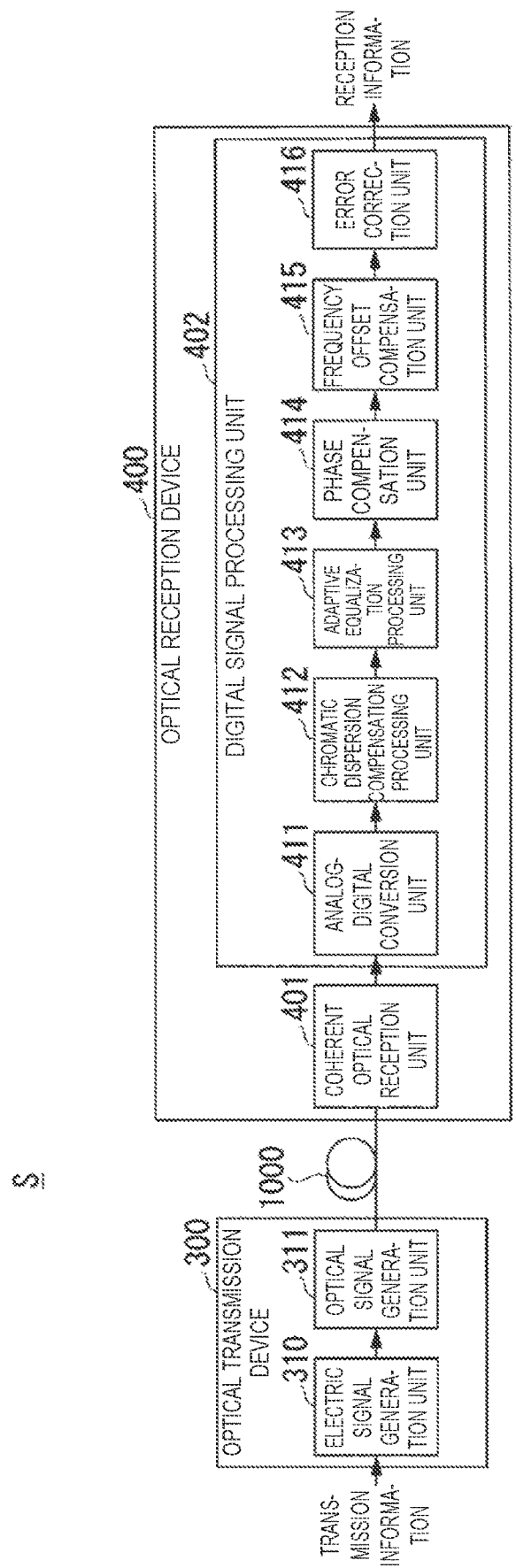
FIG. 15 is a diagram an example of a configuration of an optical transmission system that receives an optical signal using a coherent detection scheme.
Figure 16:
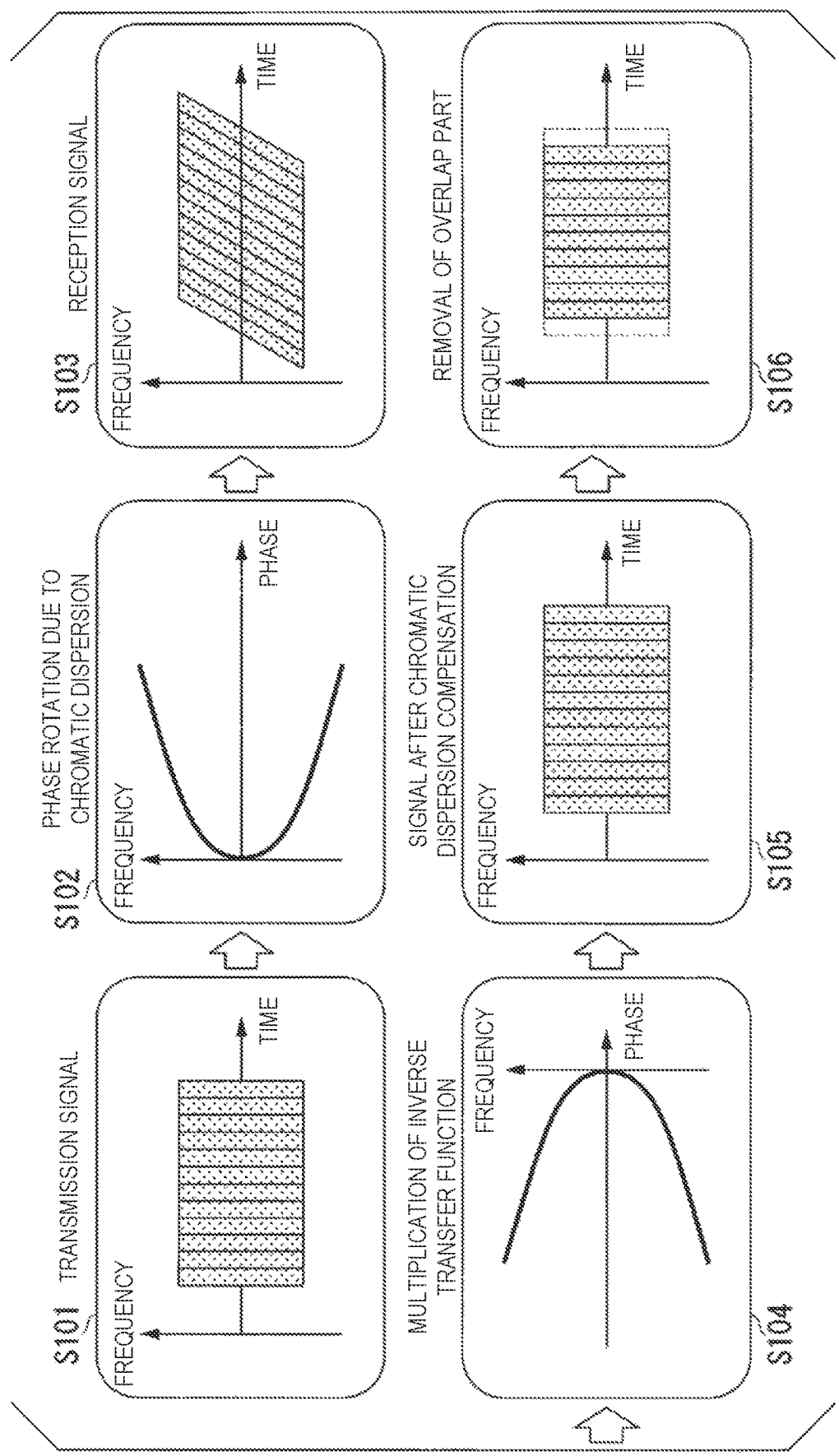
FIG. 16 is a diagram showing a procedure of chromatic dispersion compensation processing.
Figure 17:
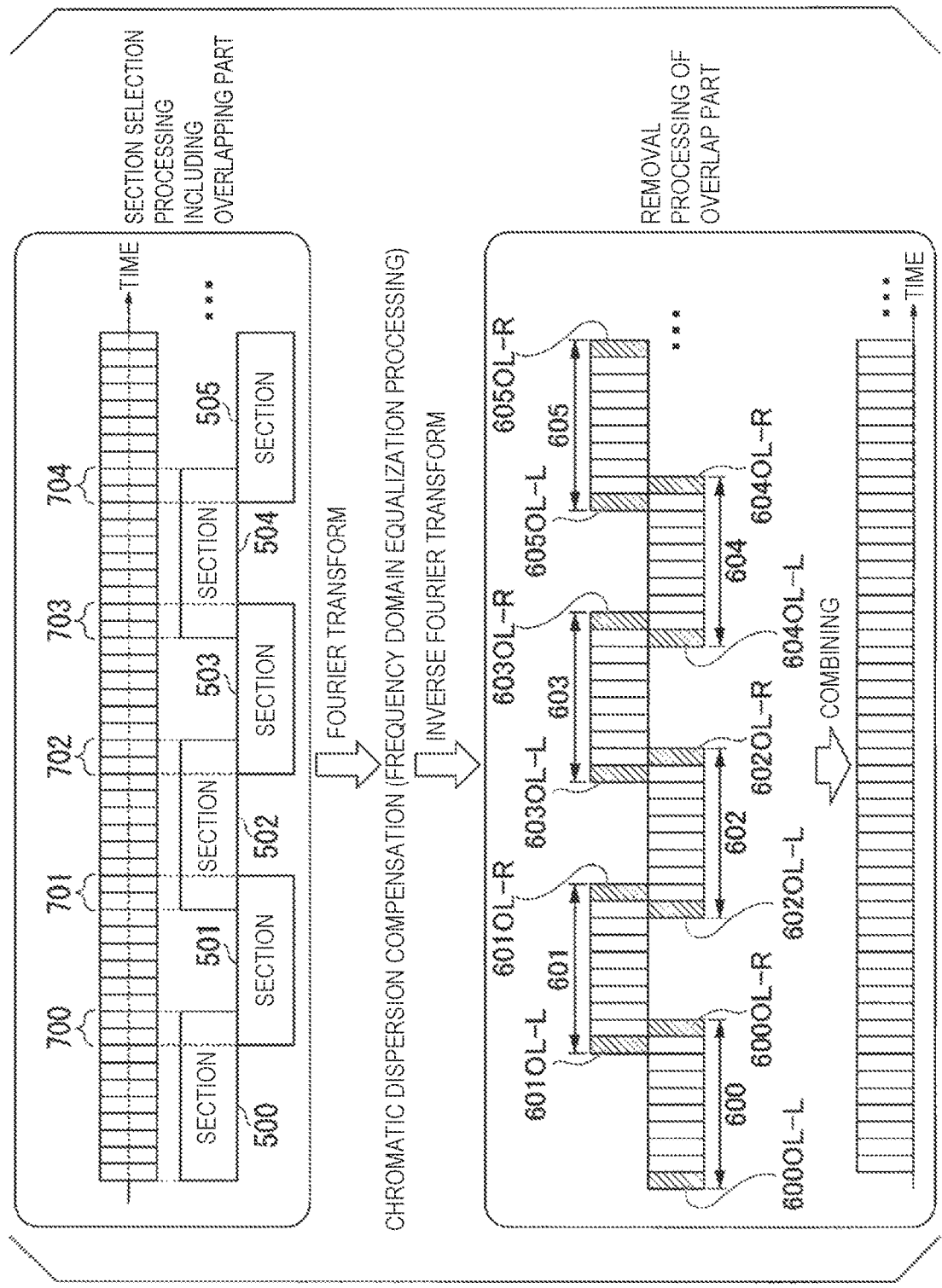
FIG. 17 is a diagram showing a procedure of overlap processing.
Figure 18:
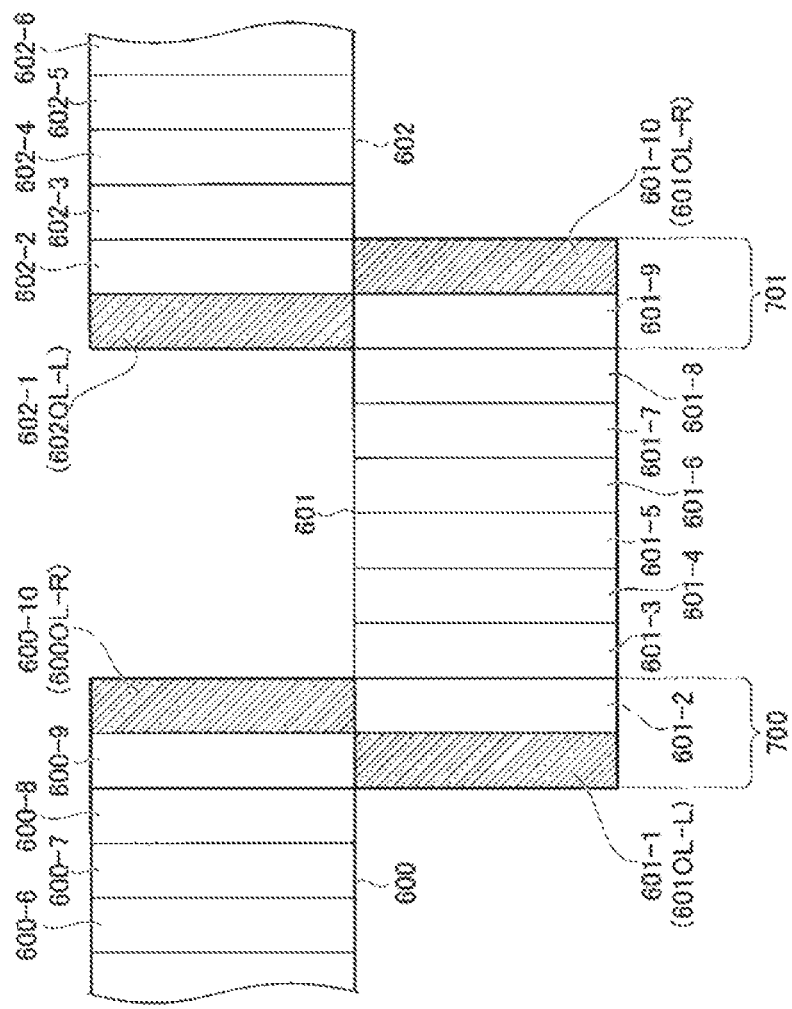
FIG. 18 is one diagram showing a relation between overlapping parts and overlap parts.
Figure 19:
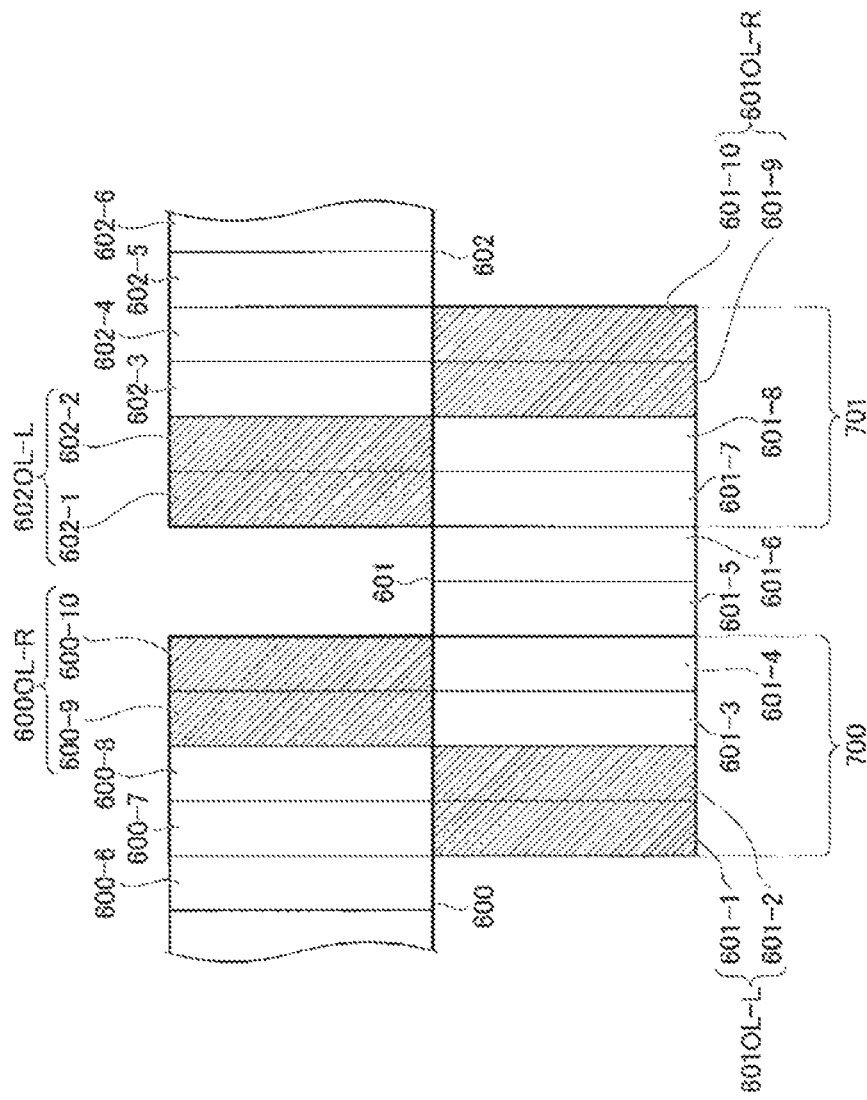
FIG. 19 is another diagram showing a relation between overlapping parts and overlap parts.

As shown in FIGS. 6 and 13, processing targets of the inverse Fourier transform unit 41-1 are division processing blocks 70-1, 71-1, 72-1, 73-1, . . . each having a length of 8 boxes, that is, "512" samples. In addition, processing targets of the inverse Fourier transform unit 41-2 are also division processing blocks 70-2, 71-2, 72-2, 73-2, . . . each having a length of 8 boxes, that is, "512" samples.

As shown in FIG. 13, the delay unit 43-1 gives a delay to each of the division processing blocks 70-1, 71-1, 72-1, 73-1, . . . output from the inverse Fourier transform unit 41-1, and adjusts a timing on a time axis. The delay unit 43-1 outputs reception signals included in the division processing blocks 70-1, 71-1, 72-1, 73-1, . . . whose timings are adjusted, as a continuous signal sequence.

Similarly, the delay unit 43-2 gives a delay to each of the division processing blocks 70-2, 71-2, 72-2, 73-2, . . . output from the inverse Fourier transform unit 41-2, and adjusts a timing on a time axis. The delay unit 43-2 outputs reception signals included in the division processing blocks 70-2, 71-2, 72-2, 73-2, . . . whose timings are adjusted, as a continuous signal sequence (step Sb5).

Processing of the pre-combination section selection units 33-1 and 33-2 in the second embodiment will be described below. In the second embodiment, a length of "256" samples is predetermined as an overlap part corresponding to sections 60, 61, 62, . . . selected by the section selection unit 30 as in the first embodiment. The pre-combination section selection unit 33-1 outputs the signal sequence of the reception signal output from the delay unit 43-1 to the Fourier transform unit 50-1 as it is. The pre-combination section selection unit 33-2 outputs the signal sequence of the reception signal output from the delay unit 43-2 to the Fourier transform unit 50-2 as it is. Here, the meaning of "to output the signal sequence of the reception signal as it is" is "to output the input signal sequence of the reception signal without processing".

As shown in FIG. 13, the pre-combination section selection unit 33-1 selects, for the signal sequence of the reception signal output from the delay unit 43-1, sections 90b-1, 91b-1, 92b-1, 93b-1, . . . having a length of "512" samples.

In the second embodiment, since the overlap part is not removed in the chromatic dispersion compensation units 32b-1 and 32b-2 unlike the first embodiment, overlap parts 70OL-1-L and 70-1-R of 128 samples remain in the division processing block 100b-1. In addition, overlap parts 71OL-1-L and 71OL-1-R having a length of 128 samples for two boxes also remain in the division processing block 101b-1.

The pre-combination section selection unit 33-1 sequentially outputs the selected sections 90b-1, 91b-1, 92b-1, 93b-1, . . . as it is to the Fourier transform unit 50-1 as division processing blocks 100b-1, 101b-1, 102b-1, 103b-1, . . . .

Similarly, the pre-combination section selection unit 33-2 selects, for the signal sequence of the reception signal output from the delay unit 43-2, sections 90b-2, 91b-2, 92b-2, 93b-2, having a length of "512" samples. The pre-combination section selection unit 33-2 sequentially outputs the selected sections 90b-2, 91b-2, 92b-2, 93b-2, . . . as it is to the Fourier transform unit 50-2 as division processing blocks 100b-2, 101b-2, 102b-2, 103b-2, . . . (step Sb6). Note that the number of processing samples of the pre-combination section selection units 33-1 and 33-2 in the second embodiment is "0" sample because there is no overlap part at both ends unlike the first embodiment.

The Fourier transform unit 50-1 uses an FFT to transform time-domain reception signals included in the division processing blocks 100b-1, 101b-1, 102b-1, 103b-1, . . . output from the pre-combination section selection unit 33-1 into frequency-domain reception signals. Similarly, the Fourier transform unit 50-2 uses the FFT to transform time-domain reception signals included in the division processing blocks 100b-2, 101b-2, 102b-2, 103b-2, . . . output from the pre-combination section selection unit 33-2 into frequency-domain reception signals (step Sb7). In the second embodiment, the number of processing samples of the Fourier transform units 50-1 and 50-2 is "512" samples which are the number of samples to be processed once by the FFT.

The combination unit 51 combines the division processing blocks 100b-1, 101b-1, 102b-1, 103b-1, . output from the Fourier transform unit 50-1 and the division processing blocks 100b-2, 101b-2, 102b-2, 103b-2, . . . output from the Fourier transform unit 50-2, respectively, to be continuous on a frequency axis and generates processing blocks 100b, 101b, 102b, 103b, . . . (step Sb8). The number of processing samples of the combination unit 51 in the second embodiment is "1024" samples, which are the length of the post-combination processing blocks 100b, 101b, . . . .

The inverse Fourier transform unit 52 uses an IFFT to transform the reception signals included in the processing blocks 100b, 101b, 102b, 103b, . . . combined by the combination unit 51 into time-domain reception signals and outputs the receptions signals (step Sb9). In the second embodiment, the number of processing samples of the inverse Fourier transform unit 52 is "1024" samples which are the same as that of the combination unit 51.

As shown in FIG. 13, the post-combination overlap cut unit 35 removes overlap parts 100bOL-L, 100bOL-R, 101bOL-L, 101bOL-R, 102bOL-L, 102bOL-R, 103bOL-L, 103bOL-R, . . . having a length of "256" samples, that is, 4 boxes from both ends of each of the processing blocks 100b, 101b, 102b, 103b, . . . transformed into the time-domain reception signal output from the inverse Fourier transform unit 52.

The post-combination overlap cut unit 35 combines the reception signals, from which the overlap parts 100bOL-L, 100*b*OL-R, 101*b*OL-L, 101*b*OL-R, 102*b*OL-L, 102*b*OL-R, 103*b*OL-L, 103*b*OL-R, . . . are removed, so as to form a continuous signal sequence, and outputs the signals to the adaptive equalization processing unit 24 (step Sb10). In the second embodiment, the number of processing samples of the post-combination overlap cut unit 35*b* is a total value of the lengths of the overlap parts to be removed from both ends of one processing block, and is "512" samples, which are twice the "256" samples.

With the configuration of the second embodiment, the section selection unit 30 selects, for the reception signal obtained by reception of the optical signal with the coherent detection scheme, the sections 60, 61, . . . in which the overlapping parts 80, 81, . . . (first overlapping part) determined based on the overlap parts 70OL-L, 70OL-R, . . . (first overlap part) are generated between the sections 60, 61, . . . adjacent to each other in time-series order. The section selection unit 30 described above sequentially outputs the reception signals included in the selected sections 60, 61, . . . as the processing block 70, 71, . . . , respectively. The Fourier transform unit 31 transforms the reception signal for each of the processing blocks 70, 71, . . . output from the section selection unit 30 into the frequency domain. The Fourier transform unit 31 divides the processing blocks 70, 71, . . . including the reception signal transformed into the frequency domain into two frequency bands, and outputs the blocks as the division processing blocks 70-1, 70-2, 71-1, 71-2, . . . . The chromatic dispersion compensation units 32 *b*-1 and 32-*b*-2 are provided for each frequency band, performs the chromatic dispersion compensation on the division processing blocks 70-1 and 70-2, 71-1 and 71-2, . . . of the corresponding frequency bands, performs the inverse Fourier transform, and then performs the process of adjusting the timings of the division processing blocks 70-1 and 70-2, 71-1 and 71-2, . . . on the time axis. The pre-combination section selection unit 33-1 and 33-2 arrange the division processing blocks 70-1 and 70-2, 71-1 and 71-2, . . . output from the chromatic dispersion compensation units 32*b*-1 and 32*b*-2 corresponding thereto in time-series order, select the sections 90*b*-1 and 90*b*-2, 91*b*-1 and 91*b*-2, . . . , and sequentially output as the division processing blocks 100*b*-1 and 100*b*-2, 101*b*-1 and 101*b*-2, . . . . The combination processing unit 34 combines the division processing blocks 100*b*-1 and 100*b*-2, 101*b*-1 and 101*b*-2, . . . output from the pre-combination section selection units 33-1 and 33-2, respectively, to be continuous on the frequency axis, and generates the processing blocks 100*b*, 101*b*, . . . . The post-combination overlap cut unit 35*b* removes the overlap parts 100*b*OL-L, 100*b*OL-R, 101*b*OL-L, 101*b*OL-R, . . . having a predetermined length from both ends of the processing blocks 100*b*, 101*b*, . . . . In the chromatic dispersion compensation processing unit 23 of the first embodiment, the overlap cut units 42-1 and 42-2 and the post-combination overlap cut unit 35 included in the chromatic dispersion compensation units 32-1 and 32-2 remove the corresponding overlap parts. On the other hand, in the chromatic dispersion compensation processing unit 23*b* of the second embodiment, the post-combination overlap cut unit 35*b* is configured to finally remove the overlap parts collectively. With such a configuration, the same effect as that of the chromatic dispersion compensation processing unit 23 of the first embodiment can be obtained, that is, in the chromatic dispersion compensation processing involving the frequency band division processing, the deterioration of the signal quality caused by the division of the frequency band can be reduced, and the chromatic dispersion compensation can be performed with a smaller configuration.

In the first and second embodiments, the Fourier transform unit 31 is configured to divide the processing block into two frequency bands of the positive frequency band and the negative frequency band based on the center frequency, but may be configured to divide the processing block into two frequency bands or three or more frequency bands based on any frequency other than the center frequency.

In the first and second embodiments, the Fourier transform unit 31 divides the processing block into the division processing blocks with equal division, but with any division rather than the equal division. For example, in the case of four divisions, it may be divided into 128, 128, 256, and 512 samples.

Further, the examples shown in the above-described first and second embodiments are merely examples, and the amount of chromatic dispersion to be compensated may be arbitrarily set. In addition, the size of the processing block, the size of the overlapping part, and the size of the overlap part may be arbitrarily set.

In the first and second embodiments described above, the pre-combination section selection units 33-1 and 33-2 are provided immediately before the combination processing unit 34, but may be provided at any position after the frequency band is divided by the Fourier transform unit 31.

In the first and second embodiments described above, the combination unit 51 in the combination processing unit 34 performs the combination in the frequency domain, but the combination unit 51 may combine the division processing blocks in the time domain without the Fourier transform units 50-1 and 50-2 and the inverse Fourier transform unit 52.

In the first and second embodiments described above, the post-combination overlap cut units 35 and 35*b* are configured to be connected to the combination processing unit 34, but function units configured to perform another arithmetic operation may be provided between the combination processing unit 34 and the post-combination overlap cut unit 35 or 35*b*.

In the configuration shown in FIG. 2 of Patent Literature 1, after the processing corresponding to the processing to be performed by the delay units 43-1 and 43-2 of the first and second embodiments for dividing into the frequency bands and adjusting the timing is performed, the division processing blocks are combined once and then chromatic dispersion compensation is performed.

Also in the chromatic dispersion compensation processing unit 23 of the first embodiment, the chromatic dispersion compensation units 32-1 and 32-2 do not include the chromatic dispersion compensators 40-1 and 40-2, and may include the chromatic dispersion compensation unit 17 shown in FIG. 2 of Patent Literature 1 behind the post-combination overlap cut unit 35. Also in the chromatic dispersion compensation processing unit 23*a* shown in FIG. 10, the chromatic dispersion compensation units 32*a*-1 and 32*a*-2 do not include the chromatic dispersion compensators 40*a*-1 and 40*a*-2, and may include the function unit, which performs the chromatic dispersion compensation in the time domain, behind the post-combination overlap cut unit 35.

In the chromatic dispersion compensation processing units 23 and 23*b* of the first and second embodiments, the division processing blocks may be combined once as shown in the chromatic dispersion compensation unit 17 in FIG. 10 of Patent Literature 1 before the delay units 43-1 and 43-2 give a delay to adjust the timing. In this case, a Fourier transform unit 31 and inverse Fourier transform units 41-1 and 41-2 are newly provided immediately before the delay units 43-1 and 43-2, and the delay units 43-1 and 43-2 are connected to the inverse Fourier transform unit 41-1 and 41-2 that are newly provided.

In the first and second embodiments described above, the chromatic dispersion compensation processing units 23, 23a, and 23b have been described as the function units in the digital signal processing unit 21, but the chromatic dispersion compensation processing units 23, 23a, and 23b may be configured as a single chromatic dispersion compensation device.

The chromatic dispersion compensation processing units 23, 23a, and 23b in the above-described embodiments be implemented by utilizing a computer as a single chromatic dispersion compensation device. In this case, a program for executing the relevant functions may be stored in a computer-readable storage medium, and the program stored in the storage medium may be loaded and executed on a computer system, so as to implement the relevant device. Here, the "computer system" has hardware resources which may include an OS and peripheral devices. The above "computer-readable storage medium" is a storage device, for example, a portable medium such as a flexible disk, a magneto optical disk, a ROM, or a CD-ROM, or a memory device such as a hard disk built in a computer system. The "computer-readable storage medium" may also include a device for temporarily storing the program, for example, a device for dynamically storing the program for a short time, such as a communication line used when transmitting the program via a network (for example, the Internet) or a communication line (for example, a telephone line), or a volatile memory in a computer system which functions as a server or client in such a transmission. In addition, the program may execute a part of the above-explained functions. The program may also be a "differential" program so that the above-described functions can be executed by a combination of the differential program and an existing program which has already been stored in the relevant computer system. Furthermore, the program may be implemented by utilizing a hardware device such as a PLD (programmable logic device) or an FPGA (field programmable gate array).

Although the embodiments of the present invention have been described in detail above with reference to the drawings, the specific configuration is not limited to these embodiments, and includes a design and the like within a range not departing from the gist of the present invention.

REFERENCE SIGNS LIST 23 chromatic dispersion compensation processing unit
30 section selection unit
31 Fourier transform unit
32-1, 32-2 chromatic dispersion compensation unit
33-1, 33-2 pre-combination section selection unit
34 combination processing unit
35 post-combination overlap cut unit
40-1, 40-2 chromatic dispersion compensator
41-1, 41-2 inverse Fourier transform unit
42-1, 42-2 overlap cut unit
43-1, 43-2 delay unit
50-1, 50-2 Fourier transform unit
51 combination unit
52 inverse Fourier transform unit

The invention claimed is:

1. A chromatic dispersion compensation device that divides a reception signal obtained by receiving an optical signal using a coherent detection scheme into a plurality of frequency bands, adjusts a timing on a time axis of the reception signal for each of the divided frequency bands, performs combination processing for combining the reception signals included in the plurality of frequency bands, and performs chromatic dispersion compensation on the reception signal at any timing before or after the combination processing, the device comprising:
  a plurality of pre-combination section selection unit provided for each of the frequency bands and configured to select, before the combination processing, sections in which overlapping parts determined based on lengths of overlap parts predetermined between sections adjacent to each other in time-series order with respect to the reception signal for each of the frequency bands are generated, and to output the reception signal for each of the selected sections as a division processing block; and
  a post-combination overlap cut unit configured to remove the overlap parts from both ends of a processing block generated by combination of the division processing blocks in the combination processing so as to be continuous on a frequency axis.

2. The chromatic dispersion compensation device according to claim 1, further comprising:
  a section selection unit configured to select sections in which a first overlapping part determined based a length of a first overlap part determined between sections adjacent to each other in time-series order with respect to the reception signal are generated and to output the reception signals included in the selected sections as processing blocks;
  a Fourier transform unit configured to transform the output reception signal for each of the processing blocks into a frequency domain, to divide the processing block including the transformed reception signal into a plurality of frequency bands, and to output the processing block as the division processing block;
  a chromatic dispersion compensation unit configured to perform chromatic dispersion compensation on the division processing block of the frequency band and to remove the first overlap part from both ends of the division processing block; and
  a combination processing unit configured to perform the combination processing, wherein
  the pre-combination section selection unit uses the overlapping part as a second overlapping part, arranges the division processing blocks in time-series order, selects sections in which the second overlapping part is generated between sections adjacent to each other in time-series order, and outputs the reception signals included in the selected sections as the division processing blocks,
  the combination processing unit combines the division processing blocks to generate the processing block, and
  the post-combination overlap cut unit uses the overlap part as a second overlap part, and removes the second overlap part from both ends of the processing block.

3. The chromatic dispersion compensation device according to claim 2, wherein
  the chromatic dispersion compensation unit does not remove the first overlap part from both ends of the division processing block,
  the pre-combination section selection unit arranges the division processing blocks in time-series order and outputs the division processing blocks directly, and
  the post-combination overlap cut unit removes the first overlap part from both ends of the processing block.

4. A chromatic dispersion compensation method of dividing a reception signal obtained by receiving an optical signal using a coherent detection scheme into a plurality of frequency bands, adjusting a timing on a time axis of the reception signal for each of the divided frequency bands, performing combination processing for combining the reception signals included in the plurality of frequency bands, and performing chromatic dispersion compensation on the reception signal at any timing before or after the combination processing, the method comprising:

selecting, before the combination processing, sections in which overlapping parts determined based on lengths of overlap parts predetermined between sections adjacent to each other in time-series order with respect to the reception signal for each of the frequency bands are generated;

outputting the reception signal for each of the selected sections as a division processing block; and removing the overlap parts from both ends of a processing block generated by combination of the division processing blocks in the combination processing so as to be continuous on a frequency axis.

5. An optical reception device comprising:

a coherent optical reception unit configured to receive an optical signal using a coherent detection scheme; and a digital signal processing unit, wherein the digital signal processing unit includes an analog-digital conversion unit configured to convert an electric analog signal output from the coherent optical reception unit into a digital signal and to output the digital signal, and a chromatic dispersion compensation processing unit serving as a chromatic dispersion processing unit that is the chromatic dispersion compensation device according to claim 1 and configured to take in the digital signal output from the analog-digital conversion unit as the reception signal.

* * * * *